US012674481B2

(12) United States Patent (10) Patent No.: US 12,674,481 B2
Griffith et al. (45) Date of Patent: Jul. 7, 2026

(54) COLLAPSABLE FOUNDATION

(71) Applicant: Sleep Number Corporation, Minneapolis, MN (US)

(72) Inventors: Matthew Griffith, Buffalo, MN (US); Natalie Negus, Minneapolis, MN (US); Craig Peterson, Oak Grove, MN (US)

(73) Assignee: Sleep Number Corporation

( * ) Notice: Subject to any disclaimer, the term of this patent is extended or adjusted under 35 U.S.C. 154(b) by 0 days.

(21) Appl. No.: 18/894,736

(22) Filed: Sep. 24, 2024

(65) Prior Publication Data

US 2025/0084883 A1 Mar. 13, 2025

Related U.S. Application Data

(60) Division of application No. 17/374,369, filed on Jul. 13, 2021, now Pat. No. 12,117,028, which is a continuation of application No. 16/746,602, filed on Jan. 17, 2020, now Pat. No. 11,085,479, which is a continuation of application No. 15/266,644, filed on Sep. 15, 2016, now Pat. No. 10,539,170.

(Continued)

(51) Int. Cl.
| | |
|---|---|
| *F16B 12/56* | (2006.01) |
| *A47B 95/00* | (2006.01) |
| *A47C 19/00* | (2006.01) |
| *A47C 19/12* | (2006.01) |
| *F16B 12/20* | (2006.01) |
| *F16B 12/22* | (2006.01) |
| *F16B 12/26* | (2006.01) |
| *F16B 12/58* | (2006.01) |

(52) U.S. Cl.
CPC .............. *F16B 12/56* (2013.01); *A47B 95/00* (2013.01); *A47C 19/005* (2013.01); *A47C 19/122* (2013.01); *F16B 12/20* (2013.01); *F16B 12/22* (2013.01); *F16B 12/26* (2013.01); *F16B 12/58* (2013.01); *A47B 2230/0074* (2013.01); *A47B 2230/16* (2013.01)

(58) Field of Classification Search
CPC ..... A47C 19/00; A47C 19/005; A47C 19/122; A47C 17/70
See application file for complete search history.

(56) References Cited

U.S. PATENT DOCUMENTS

| | | | | |
|---|---|---|---|---|
| 337,415 A | * | 3/1886 | McKeough | .......... A47C 19/122 |
| | | | | 5/111 |
| 5,009,170 A | * | 4/1991 | Spehar | ..................... A47B 3/10 |
| | | | | 108/132 |

(Continued)

FOREIGN PATENT DOCUMENTS

CN 2781924 Y * 5/2006 ........... A47C 19/122

OTHER PUBLICATIONS

U.S. Appl. No. 18/196,658, Herman et al., filed May 12, 2023.

(Continued)

*Primary Examiner* — Eric J Kurilla
(74) *Attorney, Agent, or Firm* — Norton Rose Fulbright US LLP

(57) ABSTRACT
A bed can include one or more connectors for connecting components of the bed. For example, a frame can include a fastening mechanism for releasably connecting a cross-member to a longitudinal support. Another example includes connectors for connecting and aligning a foundation with a frame.

20 Claims, 27 Drawing Sheets

Related U.S. Application Data

(60) Provisional application No. 62/273,640, filed on Dec. 31, 2015.

(56) References Cited

U.S. PATENT DOCUMENTS

| | | | | | |
|---|---|---|---|---|---|
| 5,257,428 | A | * | 11/1993 | Carroll | A61G 7/002 5/618 |
| 6,009,575 | A | * | 1/2000 | Hsieh | A47C 19/122 5/174 |
| 6,035,467 | A | * | 3/2000 | Lee | A47C 17/70 5/174 |
| 8,935,817 | B2 | * | 1/2015 | Suh | A47C 20/041 5/174 |
| 9,907,405 | B2 | * | 3/2018 | An | A47C 19/12 |
| 10,123,629 | B2 | * | 11/2018 | Choi | A47C 19/025 |
| 10,813,466 | B2 | * | 10/2020 | Jin | A47C 19/04 |
| D932,808 | S | | 10/2021 | Keeley | |
| 11,140,999 | B2 | | 10/2021 | Peterson et al. | |
| 11,229,297 | B2 | | 1/2022 | Gaunt | |
| 11,484,128 | B2 | | 11/2022 | Stusynski et al. | |
| D982,360 | S | | 4/2023 | Negus | |
| D1,032,243 | S | | 6/2024 | Negus et al. | |
| 2002/0069462 | A1 | | 6/2002 | Gaboury et al. | |
| 2005/0204475 | A1 | | 9/2005 | Schmitz et al. | |
| 2008/0052830 | A1 | | 3/2008 | Koughan et al. | |
| 2008/0276872 | A1 | * | 11/2008 | Chern | A01K 1/0353 119/28.5 |
| 2010/0043148 | A1 | | 2/2010 | Rose et al. | |
| 2010/0287699 | A1 | * | 11/2010 | Brune | A47C 17/70 5/111 |
| 2011/0099712 | A1 | * | 5/2011 | Jin | A47C 19/122 5/174 |
| 2011/0239368 | A1 | * | 10/2011 | Boyle | A47G 9/0292 5/400 |
| 2012/0222216 | A1 | * | 9/2012 | Jin | A47C 19/122 5/400 |
| 2015/0320225 | A1 | * | 11/2015 | Boyd | A47C 19/04 5/200.1 |
| 2017/0196363 | A1 | * | 7/2017 | Ray | A47C 17/70 |
| 2018/0014656 | A1 | * | 1/2018 | Guohong | A47C 19/025 |
| 2018/0110339 | A1 | * | 4/2018 | Moon | A47C 19/122 |
| 2020/0029684 | A1 | * | 1/2020 | Jiang | A47B 97/00 |
| 2020/0375368 | A1 | * | 12/2020 | Choi | A47C 20/04 |
| 2021/0177155 | A1 | | 6/2021 | McGuire et al. | |
| 2021/0244196 | A1 | | 8/2021 | Hilden et al. | |
| 2021/0251392 | A1 | | 8/2021 | Shakal | |
| 2021/0330090 | A1 | | 10/2021 | Shakal et al. | |
| 2022/0079349 | A1 | * | 3/2022 | Huang | A47C 19/12 |
| 2022/0192388 | A1 | | 6/2022 | Smith et al. | |
| 2022/0218116 | A1 | | 7/2022 | Rose et al. | |
| 2022/0273118 | A1 | | 9/2022 | Peterson et al. | |
| 2022/0322840 | A1 | | 10/2022 | Gaunt | |
| 2022/0369827 | A1 | | 11/2022 | Rose et al. | |
| 2023/0017015 | A1 | | 1/2023 | Karschnik et al. | |
| 2023/0027288 | A1 | | 1/2023 | Karschnik | |
| 2023/0031563 | A1 | | 2/2023 | Molina et al. | |
| 2023/0057322 | A1 | | 2/2023 | Shakal | |
| 2023/0063979 | A1 | | 3/2023 | Doffing et al. | |
| 2023/0128215 | A1 | | 4/2023 | Karschnik et al. | |
| 2023/0148764 | A1 | | 5/2023 | Negus et al. | |
| 2023/0218088 | A1 | | 7/2023 | Brosnan et al. | |
| 2023/0389717 | A1 | | 12/2023 | Yang et al. | |
| 2024/0011476 | A1 | | 1/2024 | Shakal et al. | |
| 2024/0016301 | A1 | | 1/2024 | Karschnik et al. | |
| 2024/0074592 | A1 | | 3/2024 | Gaunt | |
| 2024/0115055 | A1 | | 4/2024 | Doffing et al. | |
| 2024/0115058 | A1 | | 4/2024 | VerBockel et al. | |
| 2024/0148157 | A1 | | 5/2024 | Stusynski et al. | |
| 2024/0251961 | A1 | | 8/2024 | Shakal et al. | |
| 2024/0260762 | A1 | | 8/2024 | Shakal | |
| 2024/0298809 | A1 | | 9/2024 | Griffith et al. | |
| 2024/0315459 | A1 | | 9/2024 | Smith et al. | |
| 2024/0341497 | A1 | | 10/2024 | Sullivan et al. | |
| 2024/0349902 | A1 | | 10/2024 | Negus et al. | |

OTHER PUBLICATIONS

U.S. Appl. No. 18/799,173, Chellamuthu et al., filed Aug. 9, 2024.
U.S. Appl. No. 18/804,448, Palerm et al., filed Aug. 14, 2024.
U.S. Appl. No. 18/888,798, Doffing, filed Sep. 18, 2024.
U.S. Appl. No. 18/893,828, Gaunt, filed Sep. 23, 2024.
U.S. Appl. No. 18/894,736, Griffith et al., filed Sep. 24, 2024.
U.S. Appl. No. 18/949,636, Brosnan et al., filed Nov. 15, 2024.
U.S. Appl. No. 29/942,156, Negus et al., filed May 14, 2024.

* cited by examiner

COLLAPSABLE FOUNDATION

CROSS-REFERENCE TO RELATED APPLICATIONS

This application is a divisional of U.S. application Ser. No. 17/374,369, filed Jul. 13, 2021, which is a continuation of U.S. application Ser. No. 16/746,602, filed Jan. 17, 2020, now U.S. Pat. No. 11,085,479, which is a continuation of U.S. application Ser. No. 15/266,644, filed Sep. 15, 2016, now U.S. Pat. No. 10,539,170, which claims priority to U.S. Application Ser. No. 62/273,640, filed on Dec. 31, 2015. The disclosure of the prior applications are considered part of the disclosure of this application, and are incorporated in their entirety into this application.

TECHNICAL FIELD

This invention relates to beds, and more particularly to foundations and frame of beds.

BACKGROUND

People have traditionally used beds that come in many shapes, sizes, and styles. Such beds can range from extremely simple designs to rather complex designs that include a variety of features. Some beds commonly include a mattress, a box-spring or other foundation, and a frame. Some designs for bed components can be cumbersome and challenging to assemble. Some designs for bed components can have limited or poor functionality. Some designs for bed components can have better functionality, but at the expense of aesthetics.

SUMMARY

Some embodiments of a mattress and related assemblies can include one or more of the features and functions disclosed herein. Some embodiments can have a foundation that is connectable to a frame. A wedge connector can be used to position and retain the foundation on the frame. Some embodiments can include a fastening mechanism that releasably connects one or more cross-bars to one or more longitudinal supports. A fastening mechanism can perform multiple functions, including connecting a cross bar to a longitudinal support for a frame and connecting a foundation to that frame. A spring clip can be included on the fastening mechanism to facilitate the connection. Some embodiments can be disassembled and packaged in shippable boxes. Some of those embodiments can be packaged in boxes small enough to be shipped by a common carrier. Various embodiments can be configured with particular shapes and features.

In one aspect, a bed can include a foundation having a foundation connector positioned at a bottom of the foundation and a frame having a frame connector positioned at a top of the frame and positioned in a location configured to mate with the foundation connector when the foundation is position on the frame.

Some of the implementations described herein may optionally include one or more of the following features. The frame connector is substantially wedge-shaped. The frame connector is positioned at a location spaced from the perimeter of the frame. The frame connector is positioned toward a center of the frame along a cross-member of the frame. The frame connector includes a first wedge that tapers toward a first end of the frame connector and a second wedge that tapers toward a second end of the frame connector. The frame connector includes first and second wedges that define a receptacle between. The frame connector defines a receptacle configured to receive the foundation connector. The frame connector defines a receptacle configured to receive one or more center rails of the foundation. The foundation connector comprises first and second handles configured to be used to carry one or more portions of the foundation and configured to mate with the frame connector. The foundation connector is fixedly connected to a center rail of the foundation and the frame connector is fixedly connected to a cross-member of the frame.

In another aspect, a frame for a bed can include a frame connector positioned at a top of the frame and positioned in a location configured to mate with a foundation connector when a foundation is position on the frame.

Some of the implementations described herein may optionally include one or more of the following features. The frame connector is substantially wedge-shaped. The frame connector is positioned at a location spaced from the perimeter of the frame. The frame connector is positioned toward a center of the frame along a cross-member of the frame. The frame connector includes a first wedge that tapers toward a first end of the frame connector and a second wedge that tapers toward a second end of the frame connector. The frame connector includes first and second wedges that define a receptacle between. The frame connector defines a receptacle configured to receive the foundation connector. The frame connector defines a receptacle configured to receive one or more center rails of the foundation.

In another aspect, a foundation for a bed can include a foundation connector positioned at a bottom of the foundation that is configured to mate with a frame connector of a frame when the foundation is positioned on the frame.

Some of the implementations described herein may optionally include one or more of the following features. The foundation connector comprises first and second handles configured to be used to carry one or more portions of the foundation and configured to mate with the frame connector. The foundation connector is fixedly connected to a center rail of the foundation and the frame connector is fixedly connected to a cross-member of the frame.

In another aspect, a bed includes a foundation, a frame, and means for connecting the foundation to the frame.

In another aspect, a bed includes a longitudinal support, a cross-member, and a fastening mechanism that releasably connects the cross-member to the longitudinal support.

Some of the implementations described herein may optionally include one or more of the following features. The fastening mechanism comprises a spring clip. The spring clip releasably attaches and detaches to a feature on the longitudinal support without tools. The fastening mechanism includes an end stamp and a spring clip connected to an end of the cross-member and an attachment member on the longitudinal support. The fastening mechanism includes an end stamp defining a hole for connecting to a fastening mechanism and a slot for connecting to a fastening mechanism. The attachment member comprises a screw. The spring clip has a substantially fixed end and a distal end. The spring clip defines a hole. The spring clip defines a hole that aligns with a slot defined in an end stamp. The longitudinal support includes a first leg at a first end and a second leg at a second end.

In another aspect, a frame for a bed includes a longitudinal support, a cross-member, and means for releasably connecting the cross-member to the longitudinal support.

In another aspect, a bed includes a foundation having a foundation connector positioned at a bottom of the foundation and a frame having a frame connector positioned at a top of the frame and positioned in a location configured to mate with the foundation connector when the foundation is positioned on the frame.

Some of the implementations described herein may optionally include one or more of the following features. The foundation connector defines a valley that extends along a longitudinal length of the foundation connector and defines at least one slot along the valley, wherein the slot is configured to receive the frame connector. The foundation connector includes a receiver positioned at a location spaced from a perimeter of the foundation and the frame connector is positioned at a location spaced from the perimeter of the frame. The foundation connector is fixedly connected to a bottom of the foundation and the frame connector is fixedly connected to a leg portion of the frame. The frame further includes a cross-member and a leg portion and the frame connector is configured to releasably connect the cross-member to the leg portion. The frame connector defines a slot for receiving and supporting the cross-member, the cross-member comprises a flange at an end of the cross-member, and the frame connector defines a second slot between the frame connector and the leg portion for receiving the flange. The frame includes first and second longitudinal support structures extending along a portion of the longitudinal length of the frame at first and second sides of the frame, first and second cross-members extending laterally from the first longitudinal support structure to the second longitudinal support structure, and a plurality of fastening mechanisms connecting each end of the first and second cross-members to the first and second longitudinal support structures. The frame connector is one of a plurality of frame connectors and each of the fastening mechanisms includes one of the plurality of frame connectors. The frame connector includes a first wedge that tapers toward a first end of the frame connector and has a second wedge that tapers toward a second end of the frame connector, the first and second wedges define a receptacle there-between, and the foundation connector includes first and second handles configured to be used to carry one or more portions of the foundation and configured to mate with the frame connector. The longitudinal support includes a first leg at a first end and a second leg at a second end.

In another aspect, a bed includes a foundation, a frame including a longitudinal support and a cross-member, and means for connecting the foundation to the frame and for connecting the longitudinal support to the cross-member.

In another aspect, a bed includes a longitudinal support, a cross-member, and a fastening mechanism that releasably connects the cross-member to the longitudinal support.

Some of the implementations described herein may optionally include one or more of the following features. The fastening mechanism defines a slot for receiving and supporting the cross-member, the cross-member comprises a flange at an end of the cross-member, and the fastening mechanism defines a second slot between the frame connector and the leg portion for receiving the flange. The longitudinal support includes a first leg at a first end and a second leg at a second end. The fastening mechanism includes a locking mechanism for releasably locking the cross-member to the longitudinal support. The fastening mechanism is configured for releasably attaching and locking the cross-member to the longitudinal support manually, without the use of tools. The fastening mechanism includes a bracket and a lock. The lock is pivotally connected to the bracket and the bracket includes a spring for biasing the lock in a locked position. The bracket and the lock include injection molded polymers. The spring is integrally formed with the bracket during injection molding. The cross-member includes a metal flange at an end of the cross member sized and configured for mating with the bracket. The fastening mechanism includes a U-shaped bracket defining a first slot, the U-shaped bracket is fastened to an inner surface of the longitudinal support to define a second slot, a first portion of the cross-member is positioned in the first slot, and a second portion of the cross-member is positioned in the second slot between the U-shaped bracket and the longitudinal support.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
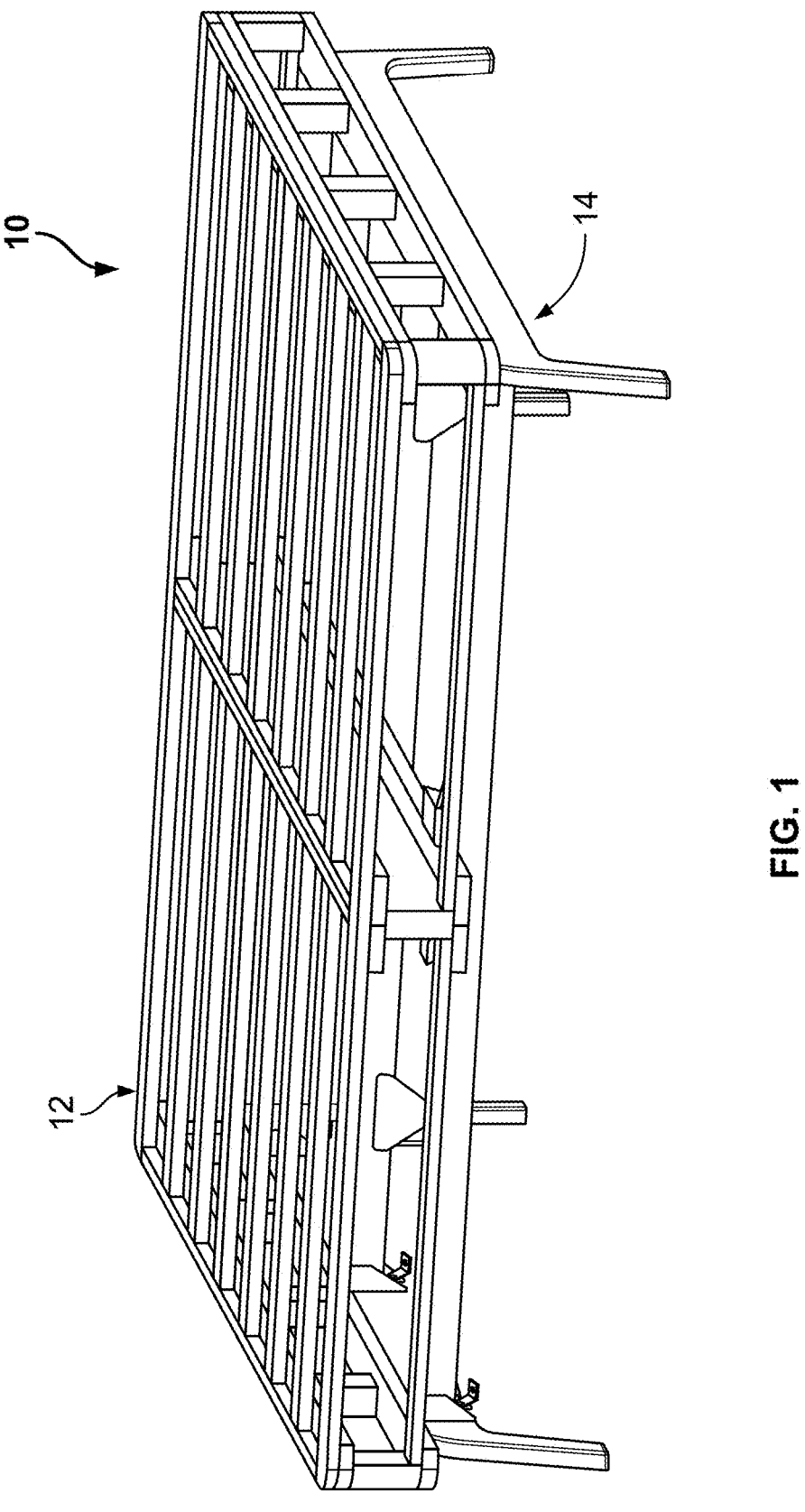
FIG. 1 is a perspective view of an embodiment of a bed having a foundation and a frame.

FIG. 1 is a perspective view of an embodiment of a bed 10 having a foundation 12 and a frame 14. The frame 14 can be positioned on a floor or other suitable surface and the foundation 12 can be positioned on and supported by the frame 14. A mattress (not shown) can be positioned on and supported by the foundation 12. For example, the foundation 12 and the frame 14 can be configured to be suitable for supporting an inflatable air mattress. Some examples of suitable air mattress for use with the bed 10 are shown and described in U.S. Provisional Patent Application No. 62/254,383, filed Nov. 12, 2015 which is incorporated by reference in its entirety. In other examples, the bed 10 can be used with other air mattress and/or other non-air mattress having foam, springs, and/or other support elements.

Figure 2A:
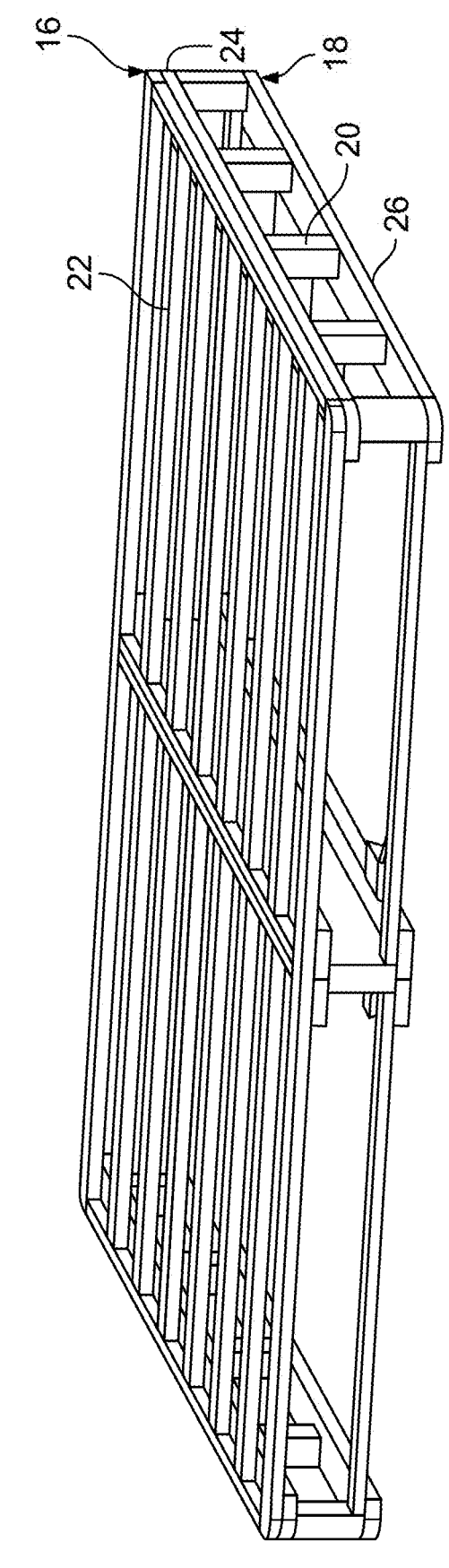
FIG. 2A is a perspective view of the foundation of FIG. 1.

FIG. 2A is a perspective view of the foundation 12. The foundation 12 can include a top portion 16 and a bottom portion 18 spaced by a set of ribs 20. The top portion 16 can include cross slats 22 extending substantially horizontally and in a plane for supporting a mattress placed on top. The cross slats 22 can extend from and be supported by a top perimeter board 24. The top perimeter board 24 can be aligned with and connected via the ribs 20 to a bottom perimeter board 26.

Figure 2B:
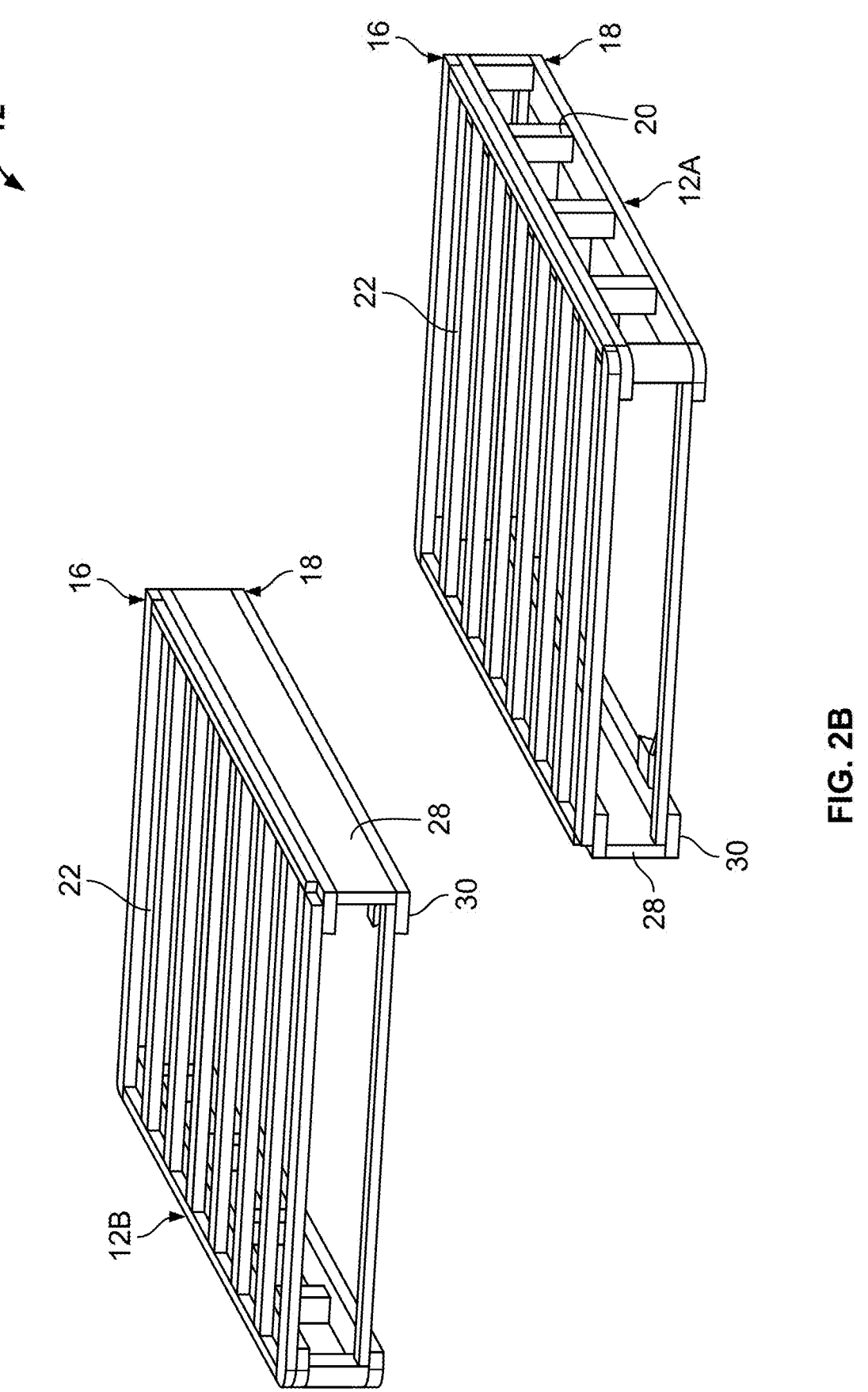
FIG. 2B is a perspective view of the foundation of FIG. 1, with the foundation split into two sections.

FIG. 2B is a perspective view of the foundation 12 split into two foundation sections 12A and 12B, which can be left and right foundation sections. The foundation sections 12A and 12B can be substantially mirror images of one-another, with some or all of the same components and features. Both foundation sections 12A and 12B can include center ribs 28 extending between the top and bottom portions 16 and 18. The bottom portions 18 can include center rails 30 positioned at bottom edges of the center ribs 28. The center ribs 28 and the center rails 30 can both extend substantially longitudinally from a head of the bed 10 to a foot of the bed 10.

In some embodiments, the foundation 12 can be formed of multiple foundation sections 12A and 12B that combine to form a single foundation. In some embodiments, the foundation 12 can be a single foundation, without easily separable halves.

In some embodiments, the foundation 12 can be a raised foundation, with the ribs 20 separating the top and bottom portions 16 and 18. This can allow for a relatively high profile bed 10. In some embodiments, the foundation 12 can be relatively thin and flat, without any ribs spacing top and bottom portions of the foundation 12. This can allow for a relatively low-profile bed 10.

Figure 3A:
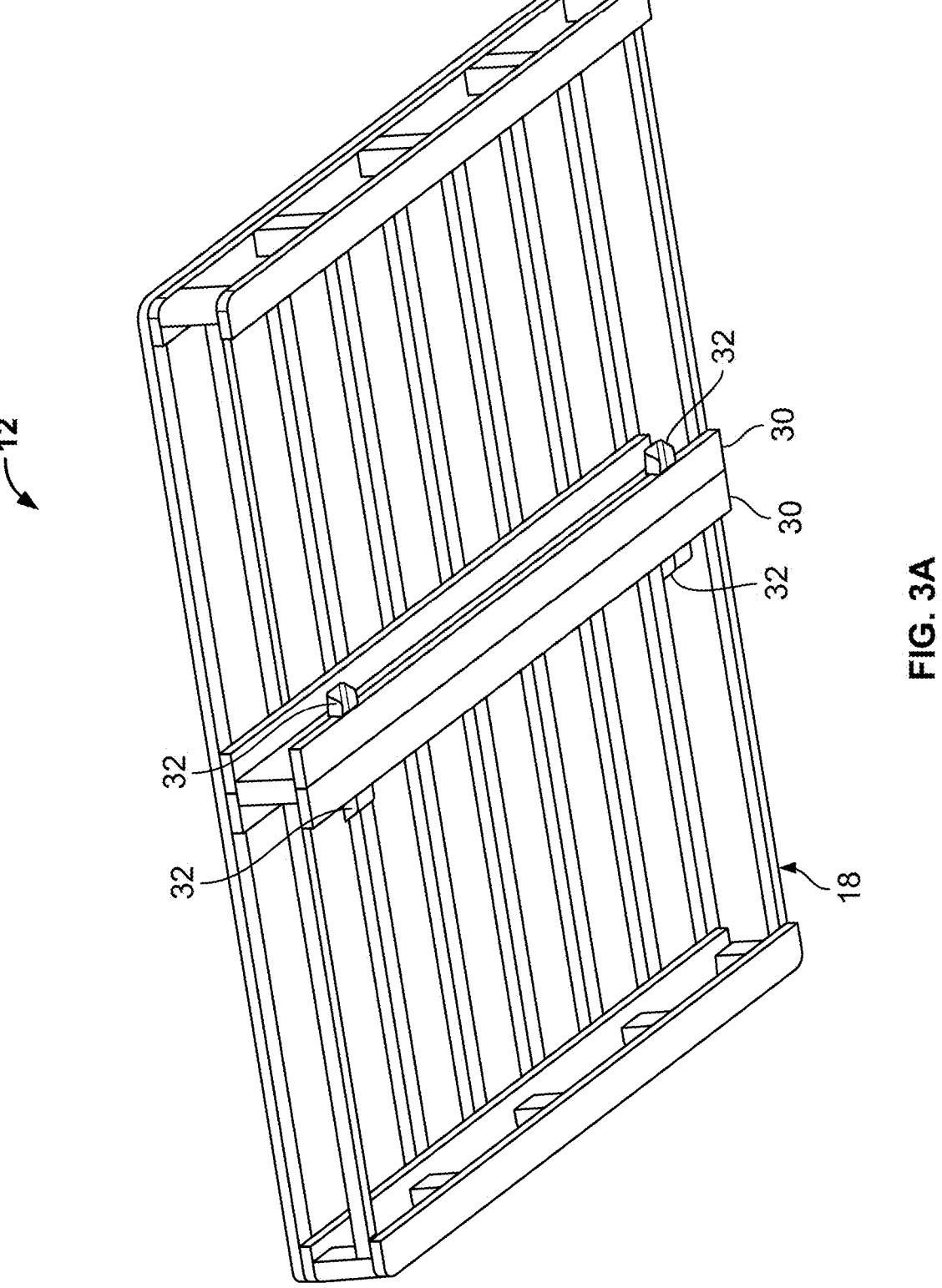
FIG. 3A is a perspective view of a bottom of the foundation of FIG. 1.
Figure 3B:
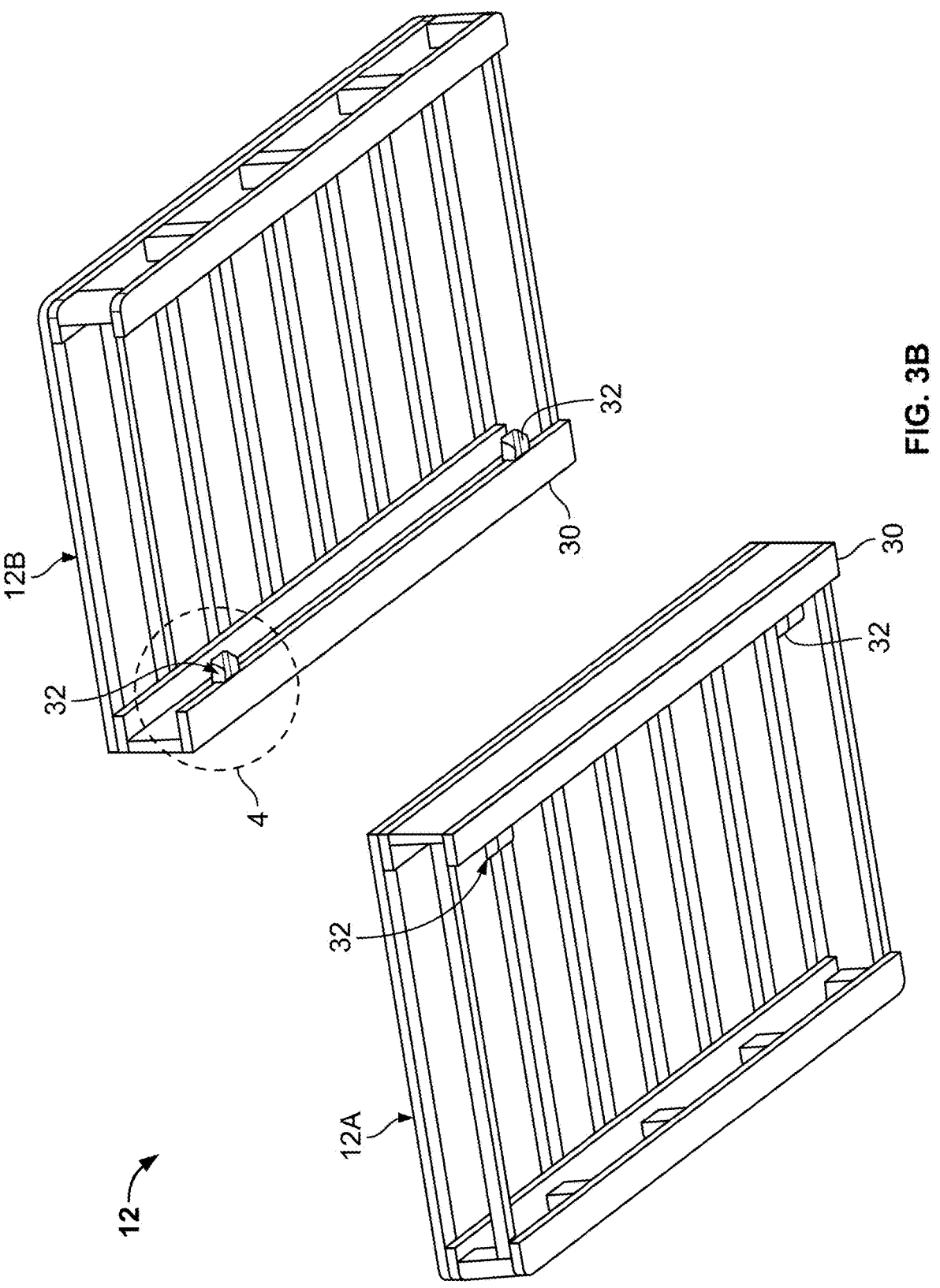
FIG. 3B is a perspective view of the bottom of the foundation of FIG. 1, with the foundation split into two sections.

FIG. 3A is a perspective view of a bottom of the foundation 12. FIG. 3B is a perspective view of the bottom of the foundation 12 split into the two foundation sections 12A and 12B. FIGS. 3A and 3B show the foundation 12 having connectors 32 at the bottom portion 18 of the foundation 12. The connectors 32 can mate with corresponding connectors on the frame 14, as further described below.

In some embodiments, the connectors 32 can function as handles for carrying the foundation sections 12A and 12B. In other embodiments, the connectors 32 need not function as handles. In some of such embodiments, the connectors 32 can be dedicated for connecting to the frame 14.

As shown in FIG. 3B, two connectors 32 can be posited along an edge of the center rail 30 of the foundation section 12A with another two connectors positioned along another edge of the center rail 30 of the foundation section 12B. Each center rail 30 can have a connector 32 positioned proximate a head end of the foundation 12 and another connector 32 positioned proximate a foot end of the foundation 12. Connectors 32 can be positioned in locations suitable for holding the foundation 12 in place.

In other embodiments, the center rails 30 can have more or fewer than two connectors 32 along an edge. The connectors 32 can be positioned at locations corresponding to mating connectors on the frame 14, as further explained below.

Figure 4:
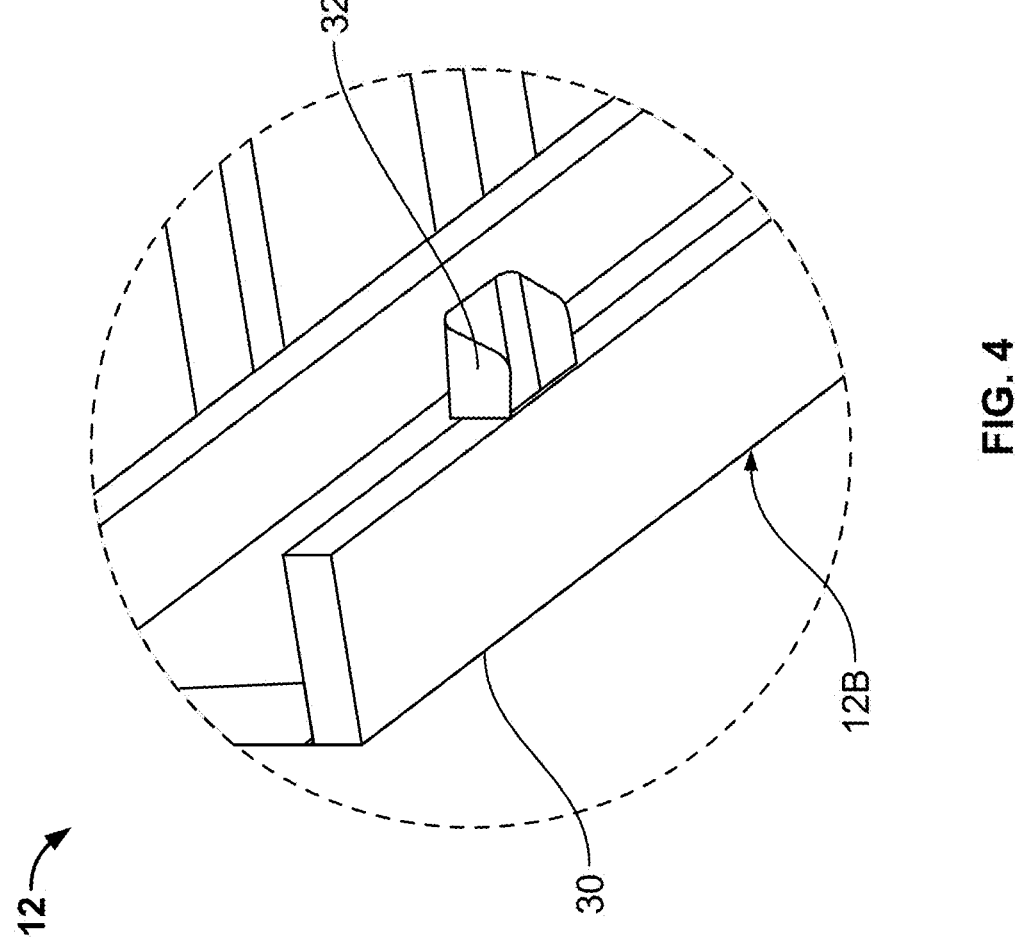
FIG. 4 is an enlarged perspective view of a center rail and handle of the foundation of FIG. 1.

FIG. 4 is an enlarged perspective view of the center rail 30 and the connector 32 of the foundation 12. FIG. 4 shows positioning and orientation of the connector 32 with respect to the center rail 30.

Figure 5A:
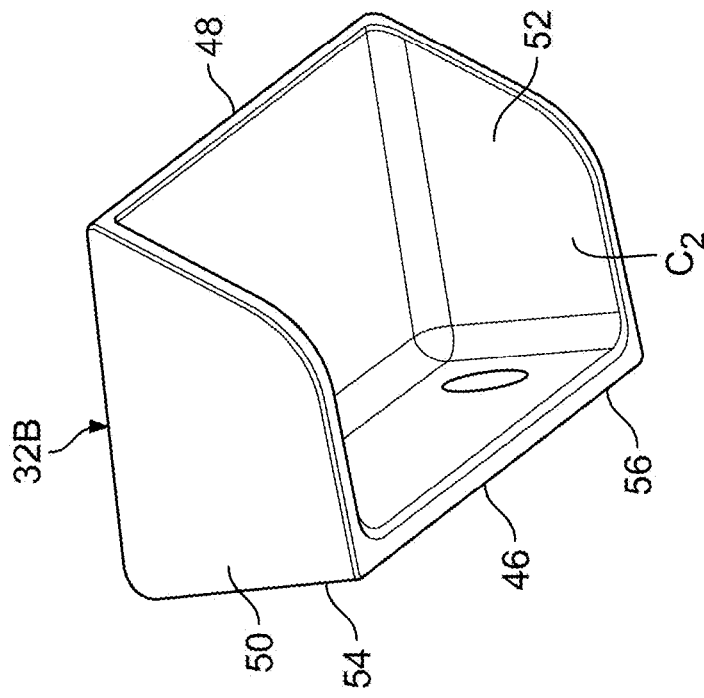
FIG. 5A is a perspective view of a bottom of two handles of the foundation of FIG. 1.
Figure 5A:
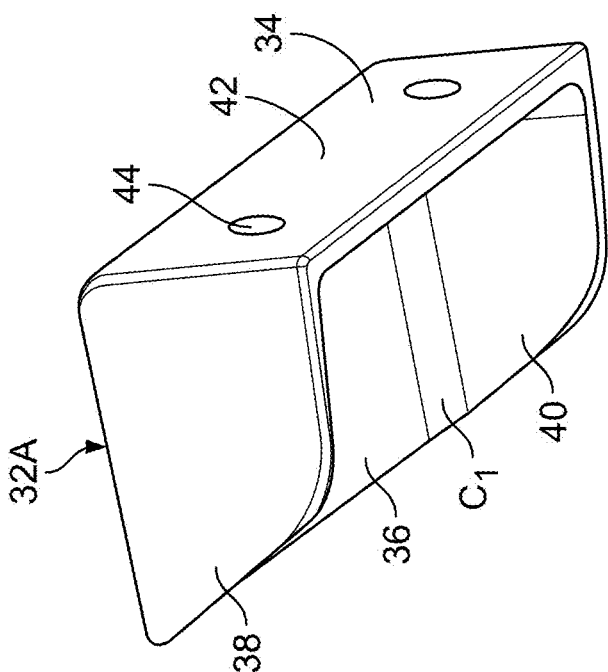

FIG. 5A is a perspective view of a bottom of two connectors 32 of the foundation 12, which will be referred to as connector 32A and connector 32B. Connector 32A can include a side wall 34, a top wall 36, and end walls 38 and 40. The side wall 34 can define a connecting surface 42 for abutting an edge surface of the center rail 30 of the foundation section 12A (shown in FIGS. 3A-4). The side wall 34 can define a pair of holes 44 for receiving screws or bolts for connecting the connector 32A to the center rail 30. The side wall 34, the top wall 36, and the end walls 38 and 40 can combine to define a cavity C1. The cavity C1 can mate with a corresponding connecting feature. In some embodiments, the cavity C1 can also act as a handle.

Connector 32B can include a side wall 46, a top wall 48, and end walls 50 and 52. The side wall 46 can define a connecting surface 54 for abutting an edge surface of the center rail 30 of the foundation section 12B (shown in FIGS. 3A-4). The side wall 46 can define a pair of holes 56 for receiving screws or bolts for connecting the connector 32B to the center rail 30. The side wall 46, the top wall 48, and the end walls 50 and 52 can combine to define a cavity C2. The cavity C2 can mate with a corresponding connecting feature. In some embodiments, the cavity C2 can also act as a handle.

Figure 5B:
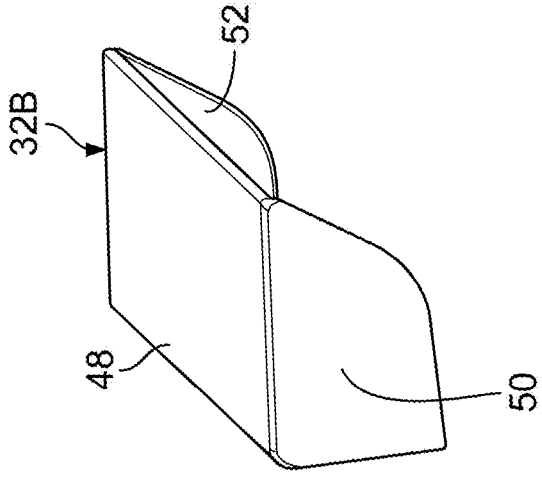
FIG. 5B is a perspective view of a top of the two handles of FIG. 5A.
Figure 5B:
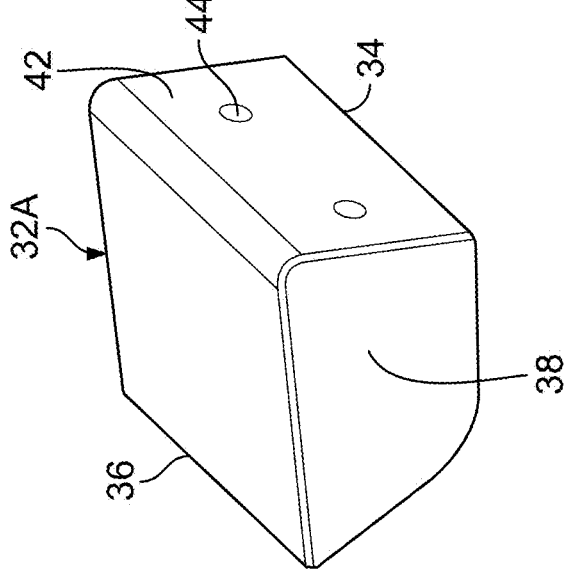

FIG. 5B is a perspective view of a top of the two connectors 32A and 32B. FIG. 5B better illustrates top surfaces of the top walls 36 and 48, which can be obscured by elements of the foundation 12 when connected to the foundation 12.

Figure 6:
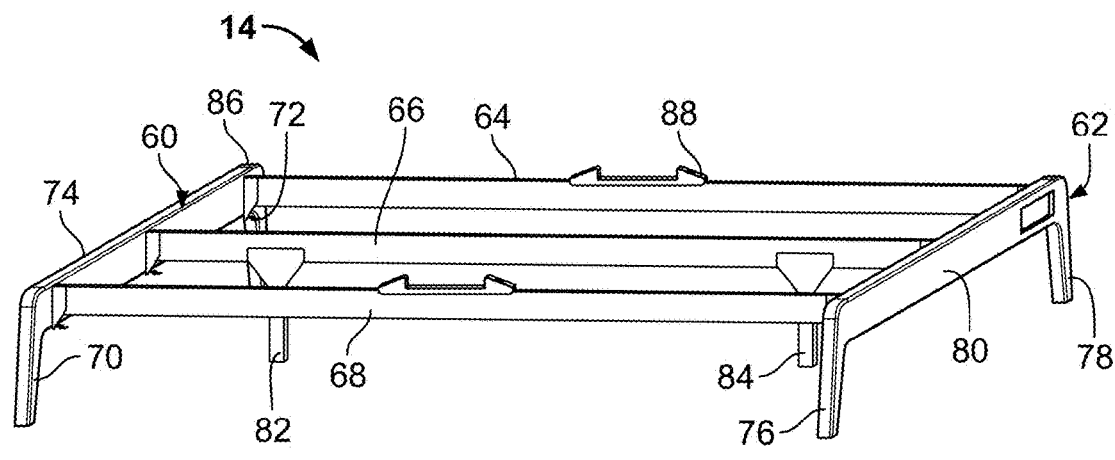
FIG. 6 is a perspective view of the frame of FIG. 1.

FIG. 6 is a perspective view of the frame 14, which can include leg portions 60 and 62 connected by cross members 64, 66, and 68. The cross members 64, 66, and 68 can connect at their respective ends to inner surfaces of the leg portions 60 and 62 to form a relatively rigid structure for supporting the foundation 12 (shown in FIGS. 1-5B).

The leg portion 60 can include legs 70 and 72 connected by a longitudinal support 74 that extends from the leg 70 to the leg 72. The leg portion 62 can include legs 76 and 78 connected by a longitudinal support 80 that extends from the leg 76 to the leg 78. The legs 70, 72, 76, and 78 can support the frame 14.

In some embodiments, the legs 70, 72, 76, and 78 can be shaped, configured, and made of a material suitable for providing support for the frame 14 in the vertical direction but that is less strong in other directions. In some of such embodiments, the legs 70, 72, 76, and 78 can be supplemented by one or more additional legs 82 and 84 connected to one or more of the cross-members 64, 66, and 68. Such one or more additional legs 82 and 84 can support the frame 14 in a way that prevents or reduces the tendency of the legs 70, 72, 76, and 78 to bend or flex sideways. This can help allow for aesthetically pleasing designs for the legs 70, 72, 76, and 78 and the entire leg portions 60 and 62 while maintaining the ability to suitably perform structurally.

In the illustrated embodiment, the legs 82 and 84 are both connected to the center-most cross-member 66. In other embodiments, one or more of the legs 82 and 84 can be connected to the cross-members 64 and 68 in addition to (or instead of) the cross-member 66.

In some embodiments, the leg portions 60 and 62 can be made of an engineered wood product that includes wood fibers combined with wax and/or a resin binder and formed into panels. For example, the leg portions 60 and 62 can be made of a medium-density fiberboard (MDF). The leg portions 60 and 62 can be laser-cut to a suitable shape, sanded and/or buffed, and then powder-coated. This can result in the leg portions 60 and 62 having suitable structural properties and aesthetic properties.

In one example, the MDF material can be cut to size with a tolerance that is less than +/−0.030". The cut part can receive pre-powder preparation and sanding by utilizing a sander to smooth the faces and edges of the part with a sander having a Y-axis tolerance of less than 0.003". The edges can be sanded to a minimum radius of 1/32" (0.8 mm). The part can then be powder coated with at least 5 mils of coverage about its surfaces and edges. Once powder-coated, the part can be sanded using an abrasive to a PCI smoothness of at least 6, buffing the part using a rotary buffer with a speed of 1800 revolutions per minute.

In other embodiments, aspects of this process can be varied in manufacturing of the leg portions 60 and 62. In still other embodiments, the leg portions 60 and 62 can be formed of an entirely different process suitable for the application.

In some embodiments, the leg portions 60 and 62 can be formed of powder coated MDF, and a metal such as steel can be used to form the cross-members 64, 66, and 68 and the legs 82 and 84. This can allow for a pair of aesthetically pleasing leg portions 60 and 62 while also relying on steel components to increase strength.

In some embodiments, the cross-members 64, 66, and 68 can be connected to the leg portions 60 and 62 via fastening mechanisms 86. In the illustrated embodiment, each of the cross-members 64, 66, and 68 includes a fastening mechanism 86 at each of their respective ends.

In some embodiments, one or more of the cross-members 64, 66, and 68 can include a connector 88. The connector 88 can be positioned, shaped, and configured for mating with one or more of the connectors 32. In some embodiments, the connector 88 can be a wedge connector that tapers from a narrow point to a tall ridge at each end of the connector 88.

Figure 7:
FIG. 7 is a perspective view of left and right leg portions of the frame of FIG. 1.

FIG. 7 is a perspective view of the leg portions 60 and 62. The leg portions 60 and 62 are shown with the cross-members 64, 66, and 68 removed for clarity.

Figure 8A:
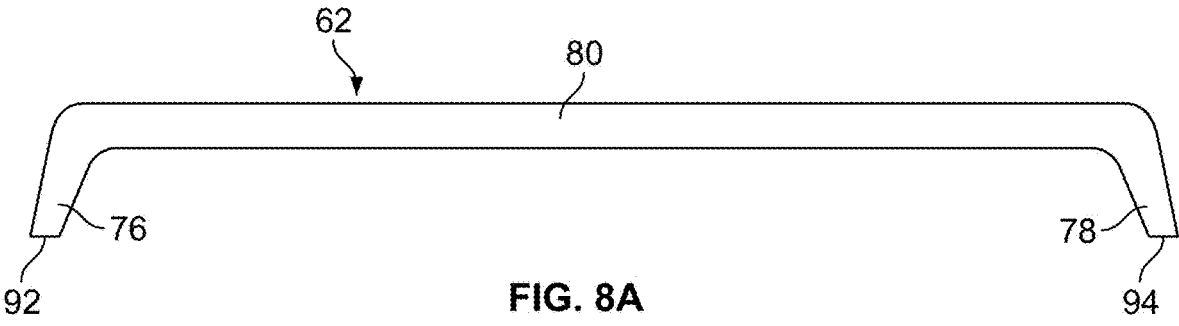
FIG. 8A is a side view of an outer side of a leg portion of the frame of FIG. 1.
Figures 8B, 8C, 8D, 8E, 8F:
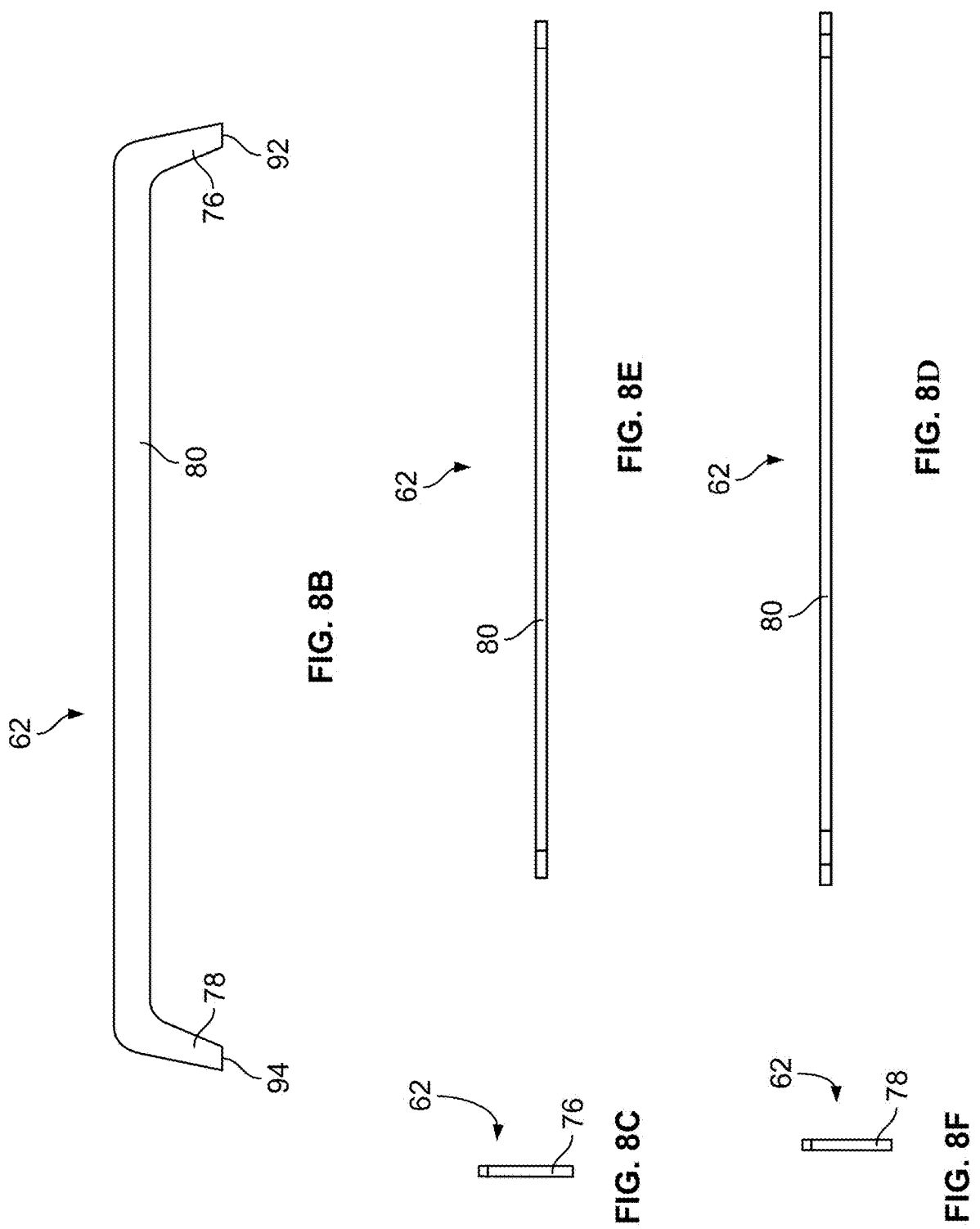
FIG. 8B is a side view of an inner side of the leg portion of FIG. 7A.
FIGS. 8C and 8D are end views of the leg portion of FIG. 7A.
FIG. 8E is a top view of the leg portion of FIG. 7A.
FIG. 8F is a bottom view of the leg portion of FIG. 7A.

FIG. 8A is a side view of an outer side of the leg portion 62. FIG. 8B is a side view of an inner side of the leg portion 62. FIGS. 8C and 8D are end views of the leg portion 62. FIG. 8E is a top view of the leg portion 62. FIG. 8F is a bottom view of the leg portion 62.

As shown in FIGS. 8A-8F, the leg portion 62 is relative thin as viewed from the top, bottom, and ends and relatively thick as viewed from the side. Thickness of the leg portion 62 tapers from the longitudinal support 80 to relatively narrow feet 92 and 94 at ends of the legs 76 and 78. The legs 76 and 78 can curve and extend from the longitudinal support 80 at an outward angle. In some embodiments, the curved, angled, and tapered shape and configuration of the leg portion 62 can be facilitated by suitable construction of the leg portion 62 in combination with other structural features of the frame 14.

Figures 9, 10:
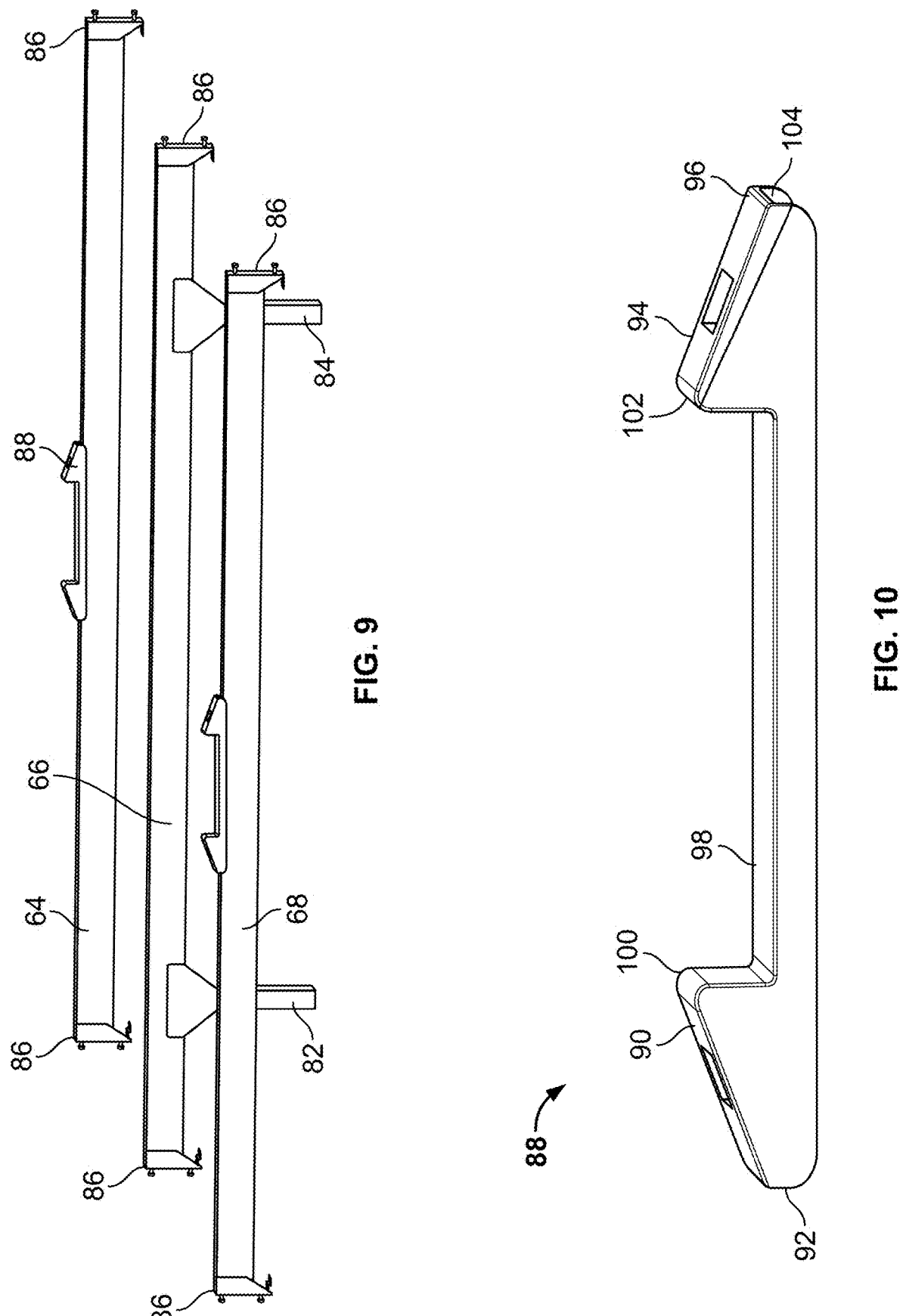
FIG. 9 is a perspective view of cross-members of the frame of FIG. 1.
FIG. 10 is a perspective view of a wedge connector for use with the cross members of the frame of FIG. 1.

FIG. 9 is a perspective view of cross-members of the frame of FIG. 1. The cross-members 64, 66, and 68 are shown with the leg portions 60 and 62 removed for clarity.

FIG. 10 is a perspective view of the connector 88. The connector 88 can be a wedge connector, which in some embodiments can have a wedge 90 at a first end 92 and a wedge 94 at a second end 96. The connector 88 can have a receptacle 98 positioned between the wedges 90 and 94. The receptacle 98 can be a recess defined by the connector 88 between the wedges 90 and 94.

In some embodiments, the wedge 90 can have a relatively narrow tip positioned at or near the first end 92 of the connector 88 and a thicker portion adjacent the receptacle 98. The wedge 90 can taper as it extends from the receptacle 98 to the first end 92. The wedge 94 can have a relatively narrow tip positioned at or near the second end 96 of the connector 88 and a thicker portion adjacent the receptacle 98. The wedge 94 can taper as it extends from the receptacle 98 to the second end 96. The wedges 90 and 94 can taper in opposite directions. Ridges 100 and 102 can be defined where the wedges 90 and 94 meet the receptacle 98.

In some embodiments, the wedges 90 and 94 and the receptacle 98 of the connector 88 can all be defined on a common side of the connector 88, such as a top side of the connector 88. In some of such embodiments, the connector 88 can also define a channel 104 on an opposite side of the connector 88, such as a bottoms surface of the connector 88. The channel 104 can extend longitudinally some or all of the way from the first end 92 to the second end 96 of the connector 88. The channel 104 can be shaped and configured to receive and connect to a support structure, such as one of the cross-members 64, 66, and 68 (shown in FIGS. 6 and 9).

Figure 11:
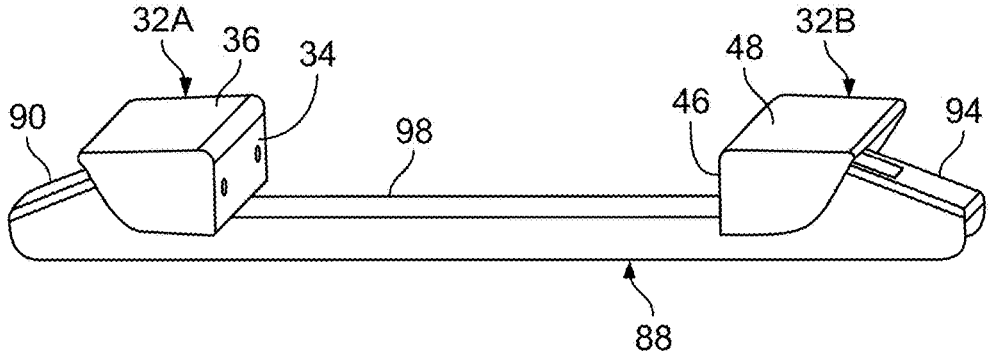
FIG. 11 is a perspective view of the wedge connector of FIG. 10 connected to the handles of FIG. 7.

FIG. 11 is a perspective view of the connector 88 connected to the connectors 32A and 32B. The connector 88 can be shaped and configured to receive and connect to the connectors 32A and 32B. In some embodiments, the connectors 32A and 32B can be shaped to mate with the wedges 90 and 94. A side wall 34 of the connector 32A can extend into the receptacle 98 and the top wall 36 can be positioned above the wedge 90 so as to at least partially surround the ridge 100 (shown in FIG. 10) of the wedge 90. A side wall 46 of the connector 32B can extend into the receptacle 98 and the top wall 48 can be positioned above the wedge 94 so as to at least partially surround the ridge 102 (shown in FIG. 10) of the wedge 94.

Figure 12:
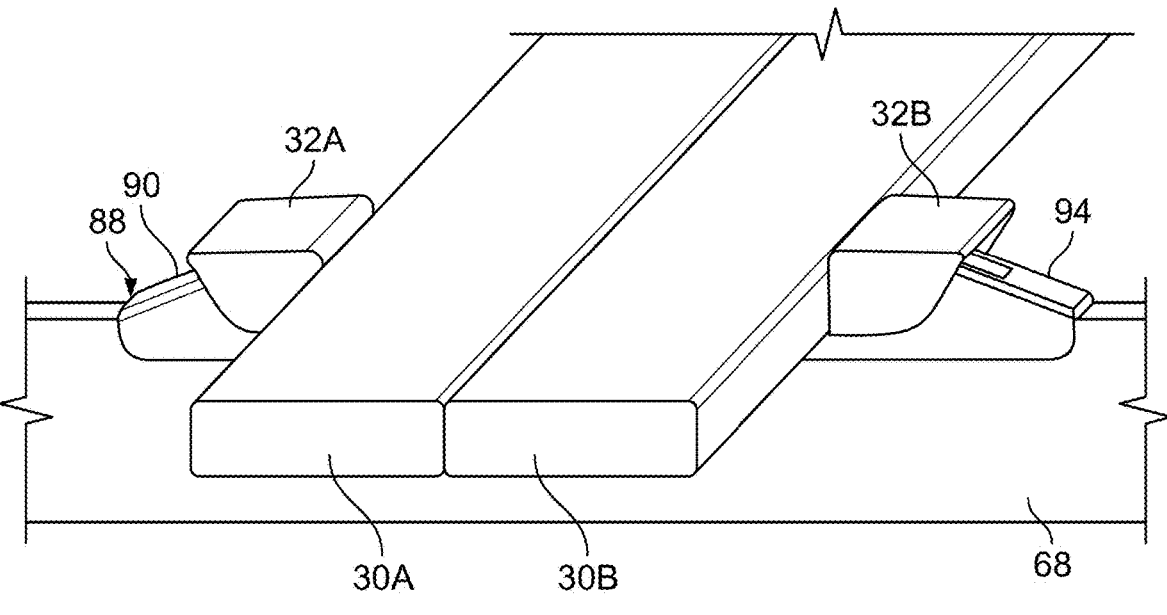
FIG. 12 is a perspective view of center rails connected to a cross-member.

FIG. 12 is a perspective view of the center rails 30A and 30B connected to the cross-member 68 via the connectors 32A, 32B, and 88. In some embodiments, the connector 32A can be fixedly connected to the center rail 30A, the connector 32B can be fixedly connected to the center rail 30B, and the connector 88 can be fixedly connected to the cross-member 68. Each of the connectors 32A, 32B, and 88 can be fixedly connected via one or more fasteners, such as screws, bolts, and adhesive.

In one example, the center rail 30A can be positioned by placing the center rail 30A on the cross-member 68 and pushed toward a center of the cross-member 68. As the center rail 30A is pushed toward a center of the cross-member 68, the center rail 30A can be pushed up the wedge 90, over the ridge 100 (shown in FIG. 10) and into the receptacle 98 (shown in FIGS. 10 and 11). The connector 32A is then releasably connected to the connector 88 and can restrict movement of the center rail 30A in three directions (toward a head of the bed 10, toward a foot of the bed 10, and toward a side of the bed 10). The center rail 30B can be positioned by placing the center rail 30B on the cross-member 68 and pushed toward a center of the cross-member 68. As the center rail 30B is pushed toward a center of the cross-member 68, the center rail 30B can be pushed up the wedge 94, over the ridge 102 (shown in FIG. 10) and into the receptacle 98 adjacent the center rail 30A. The connector 32B is then releasably connected to the connector 88 and can restrict movement of the center rail 30B in three directions (toward a head of the bed 10, toward a foot of the bed 10, and toward a side of the bed 10). The center rails 30A and 30B can abut one-another and restrict movement in a fourth direction for each of the center rails 30A and 30B.

The connector 88 can help facilitate a relatively quick and convenient connection between the frame 14 (shown in FIGS. 1 and 6) and one or more foundation sections 12, 12A, and 12B (shown in FIGS. 1 and 3A-4). The connector 88 can align the foundations sections 12, 12A, and 12B on the frame 14 and retain them in the aligned position. By positioning the connector 88 as well as the connectors 32A and 32B toward the center of the bed 10, the frame 14 need not include angle-iron or other foundation-bracketing structures at the edges of the frame 14. This can result in a frame 14 that is functional, sturdy, and aesthetically-pleasing.

Figure 13:
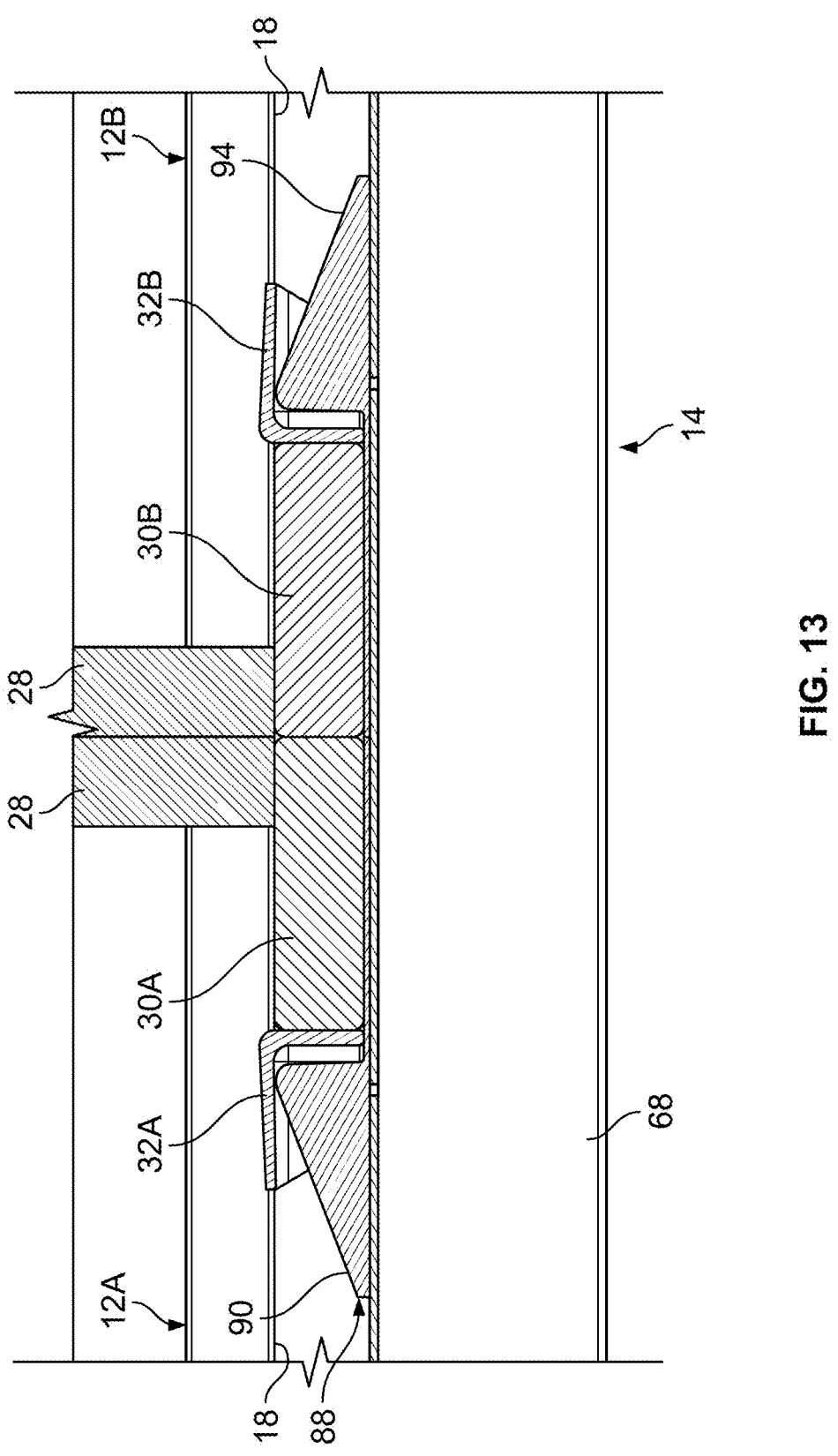
FIG. 13 is a sectional end view of center rails connected to a cross-member.

FIG. 13 is a sectional end view of the center rails 30A and 30B connected to the cross-member 68. FIG. 13 illustrates one example of positioning of the center rails 30A and 30B as well as the connectors 32A and 32B with respect to the connector 88 as well as each-other.

Figure 14:
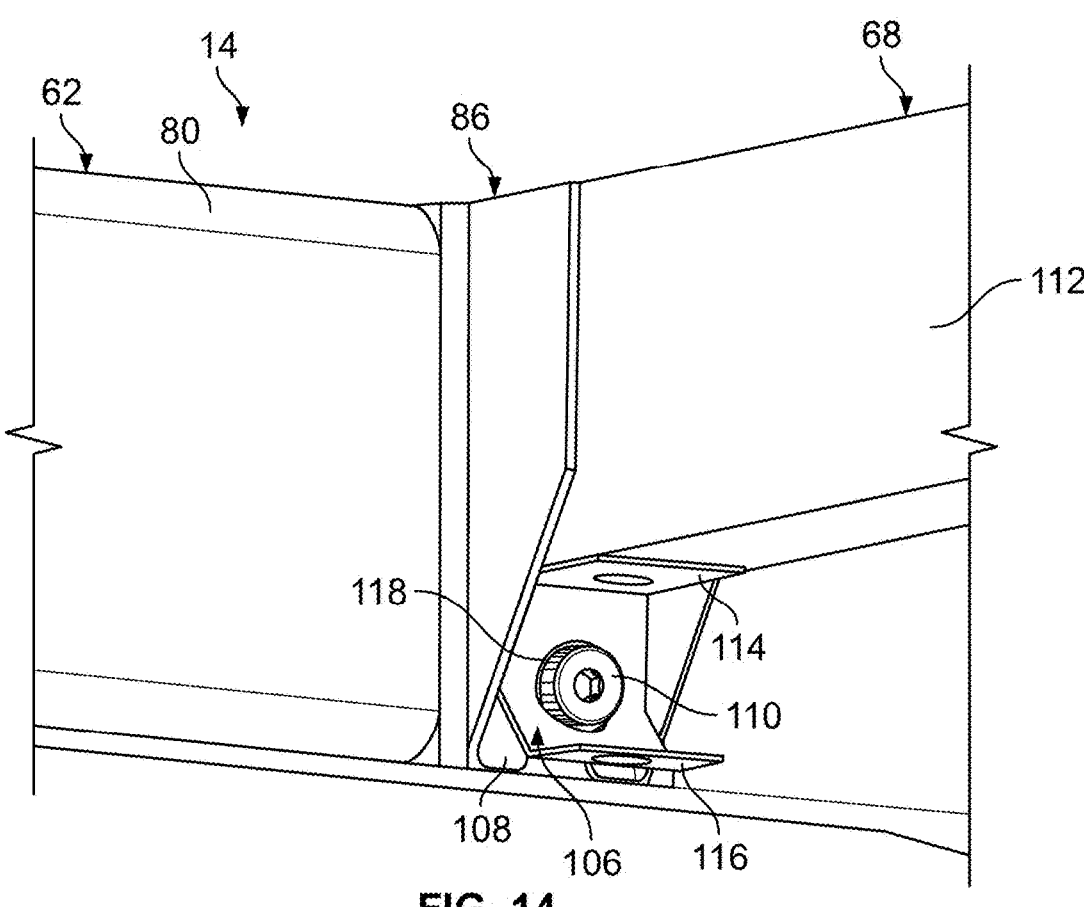
FIG. 14 is a perspective view of a cross-member connected to a leg portion.

FIG. 14 is a perspective view of the cross-member 68 connected to the leg portion 62 via the fastening mechanism 86. The fastening mechanism 86 can include one or more of a resilient connector such as a spring clip 106, a supporting structure such as an end stamp 108, and one or more attachment members such as screws 110. The screw 110 can be shoulder screws or other suitable members and can be screwed into and extend from the leg portion 62 for connecting to and supporting the cross-member 68. The end stamp 108 can be rigidly connected to a cross-member tube 112 of the cross-member 68 and can releasably connected to the screw 110. The spring clip 106 can be connected to one or both of the end stamp 108 and the cross-member tube 112 and can also be releasably connected to the screw 110.

In some embodiments, the spring clip 106 can have a fixed end 114 and a distal end 116. The fixed end 114 can be substantially fixed to the cross-member 68 in a way that allows the distal end 116 of the spring clip 106 to resiliently flex between flexed and relaxed positions. The distal end 116 can function as a handle to allow a user to grab and flex the spring clip 106. The spring clip 106 can also define a hole 118 sized for receiving a head of the screw 110. When the cross-member 68 is attached to the leg portion 62, the spring clip 106 can flex as it passes over the screw 110 and snap into the place once the screw 110 is aligned with the hole 118 of the spring clip 106. The spring clip 106 can hold the cross-member 68 in place on the leg portion 62 when the spring clip 106 is relaxed and the screw 110 is positioned in the hole 118.

A user can remove the cross-member 68 from the leg portion 62 by pressing on the distal end 116 of the spring clip 106 to flex the spring clip 106 and then raise the cross-member 68 off of the screw 110. Flexing the spring clip 106 can disengage the spring clip 106 from the screw 110 to allow for removal of the cross-member 68 from the leg portion 62.

Figure 15:
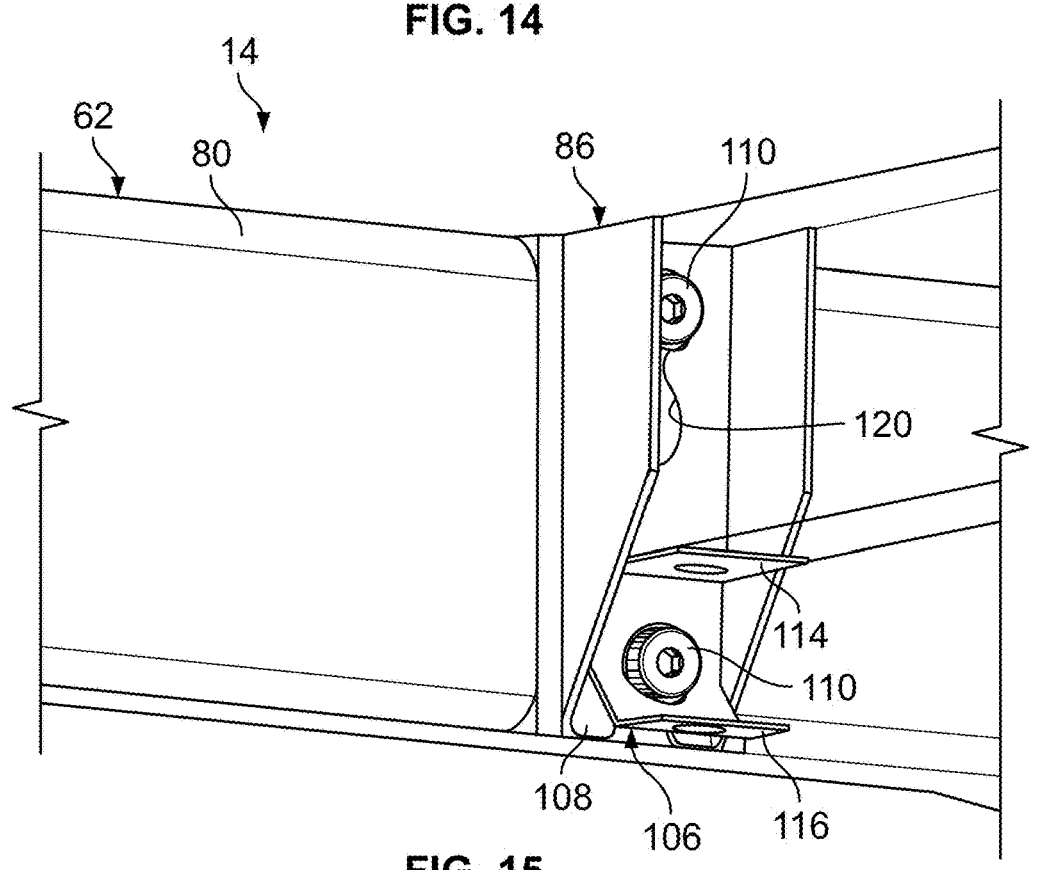
FIG. 15 is a perspective view of an end stamp and spring clip of the cross-member of FIG. 14 connected to the leg portion, with a cross-member tube removed.

FIG. 15 is a perspective view of the end stamp 108 and the spring clip 106 of the cross-member 68 (shown in FIG. 14) connected to the leg portion 62. FIG. 15 is shown with the cross-member tube 112 removed for clarity. As shown in FIG. 15, the fastening mechanism 86 can include a pair of screws 110 extending from the leg portion 62. The end stamp 108 can define one or more holes 120 for connecting to the screws. The hole 120 in the end stamp 108 can be keyhole-shaped, with a bottom portion sized larger to receive a head of the screw 110 and a top portion sized smaller to retain the head of the screw 110.

Figure 16:
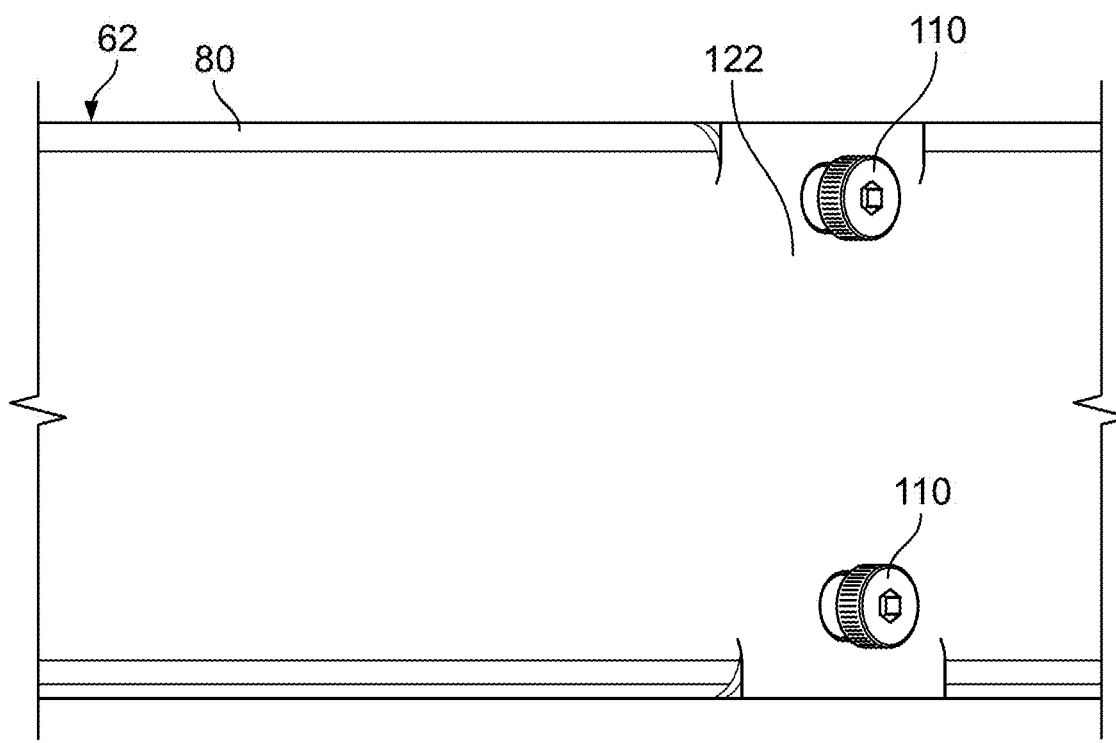
FIG. 16 is a perspective view of the leg portion and cross-member attachment location.

FIG. 16 is a perspective view of the leg portion 62 and a cross-member attachment location 122. The cross-member attachment location 122 includes the screws 110 and is positioned at a location configured for attachment to the cross-member 68 (shown in FIG. 14).

Figure 17:
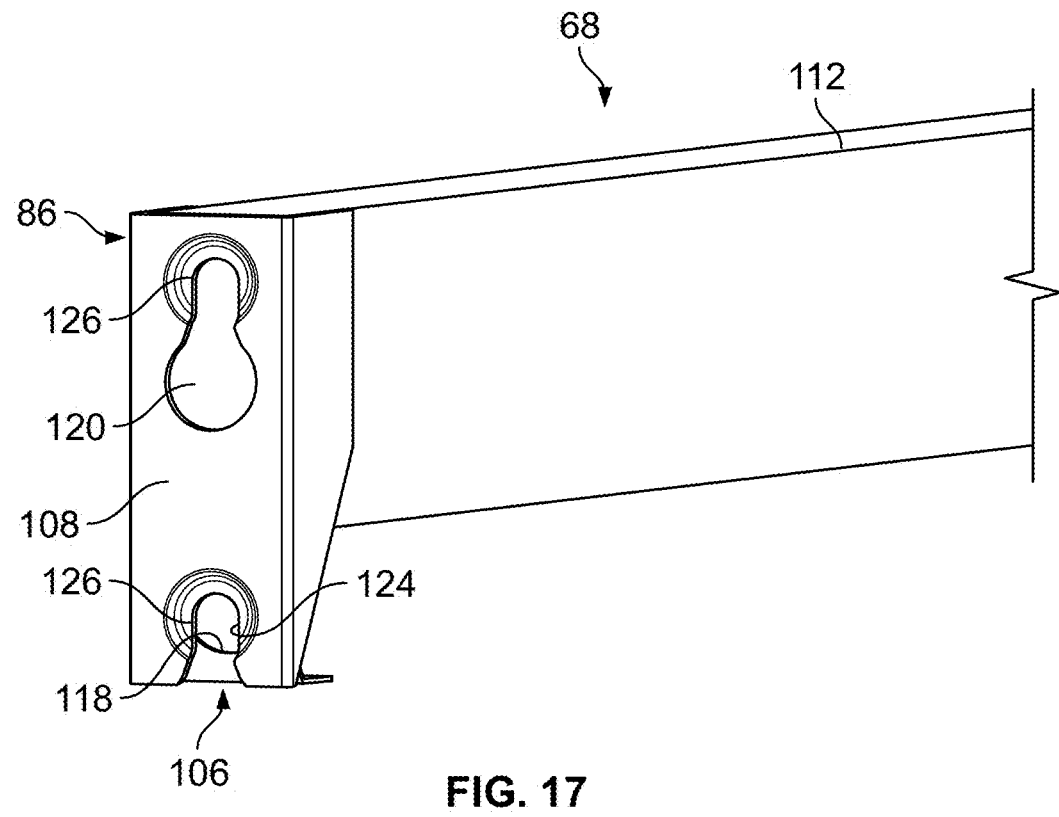
FIG. 17 is a perspective view of an end of a cross-member.

FIG. 17 is a perspective view of an end of the cross-member 68. In some embodiments, the end stamp 108 can define two holes 120 for connecting to two screws 110 (shown in FIGS. 14-16). In other embodiments, the end stamp 108 can define greater or fewer than two holes 120. In some embodiments (including the illustrated embodiment), the end stamp 108 can define one hole 120 and also a slot 124 for connecting to two screws 110. The slot 124 can be positioned below the hole 120 and can be aligned with the hole 118 of the spring clip 106. When connected, a bottom screw 110 can be positioned in both the slot 124 and the hole 118 so as to connect to both the end stamp 108 and the spring clip 106. This can create a relatively secure yet releasable connection between the cross-member 68 and the leg portion 62 (shown in FIGS. 14-16). In some embodiments, the cross-member 68 can be connected to and disconnected from the leg portion 62 without use of tools.

In some embodiments, the end stamp 108 can include one or more reliefs 126 stamped or otherwise formed in the end stamp 108. The reliefs 126 can be aligned with the hole 120 and/or the slot 124. The reliefs 126 can be positioned so as to allow space for one or more features that extend from an otherwise relatively flush surface of the leg portion 62.

Figures 18A, 18B:
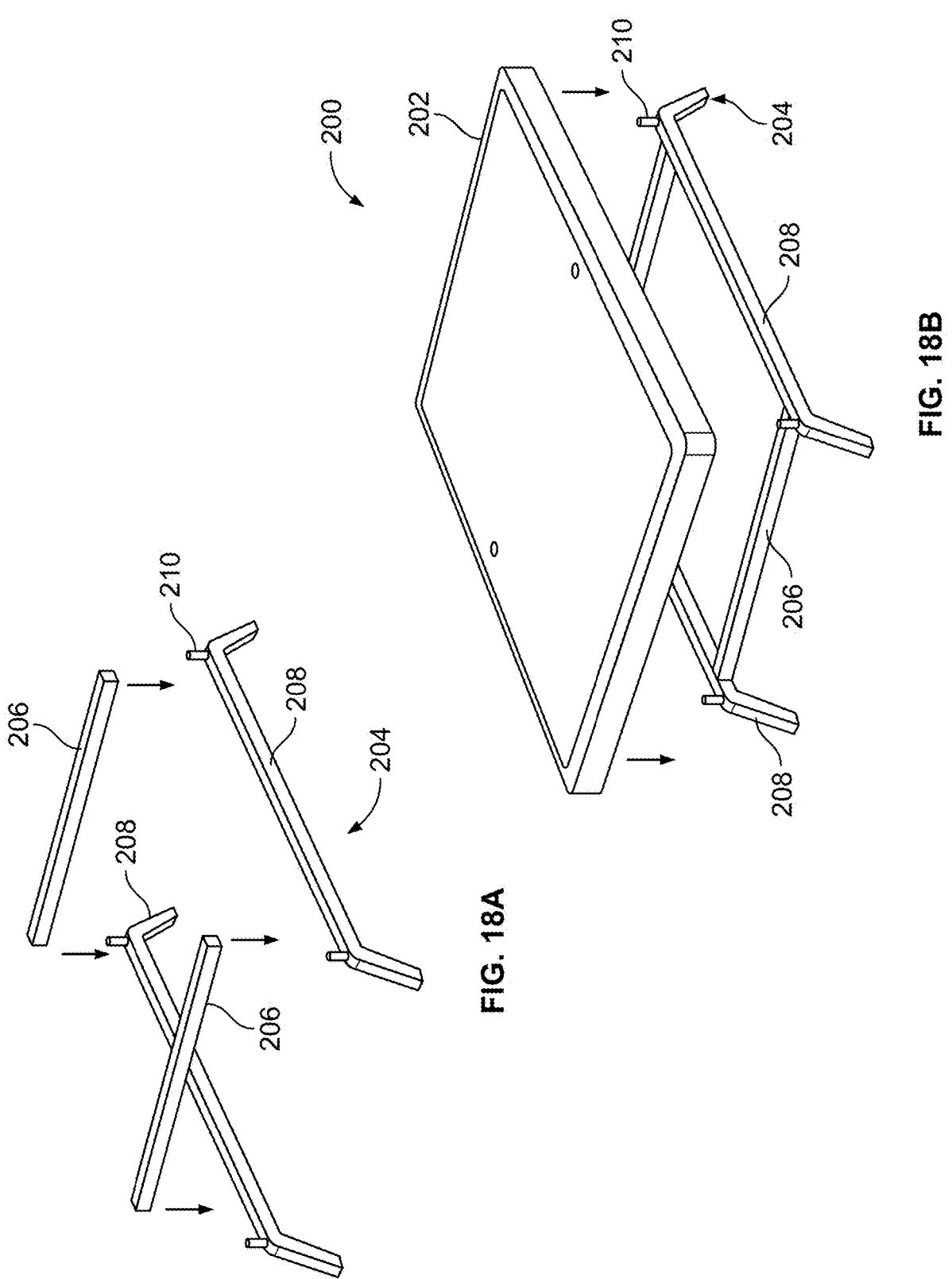
FIGS. 18A and 18B are perspective views of another embodiment of a bed having a foundation and a frame.

FIGS. 18A and 18B are perspective views of another embodiment of a bed 200 having a foundation 202 and a frame 204. The frame 204 can include cross-members 206 extending between and connecting to leg portions 208. The leg portions 208 can include connectors 210 extending upwards to connect to and align the foundation 202.

Figure 19:
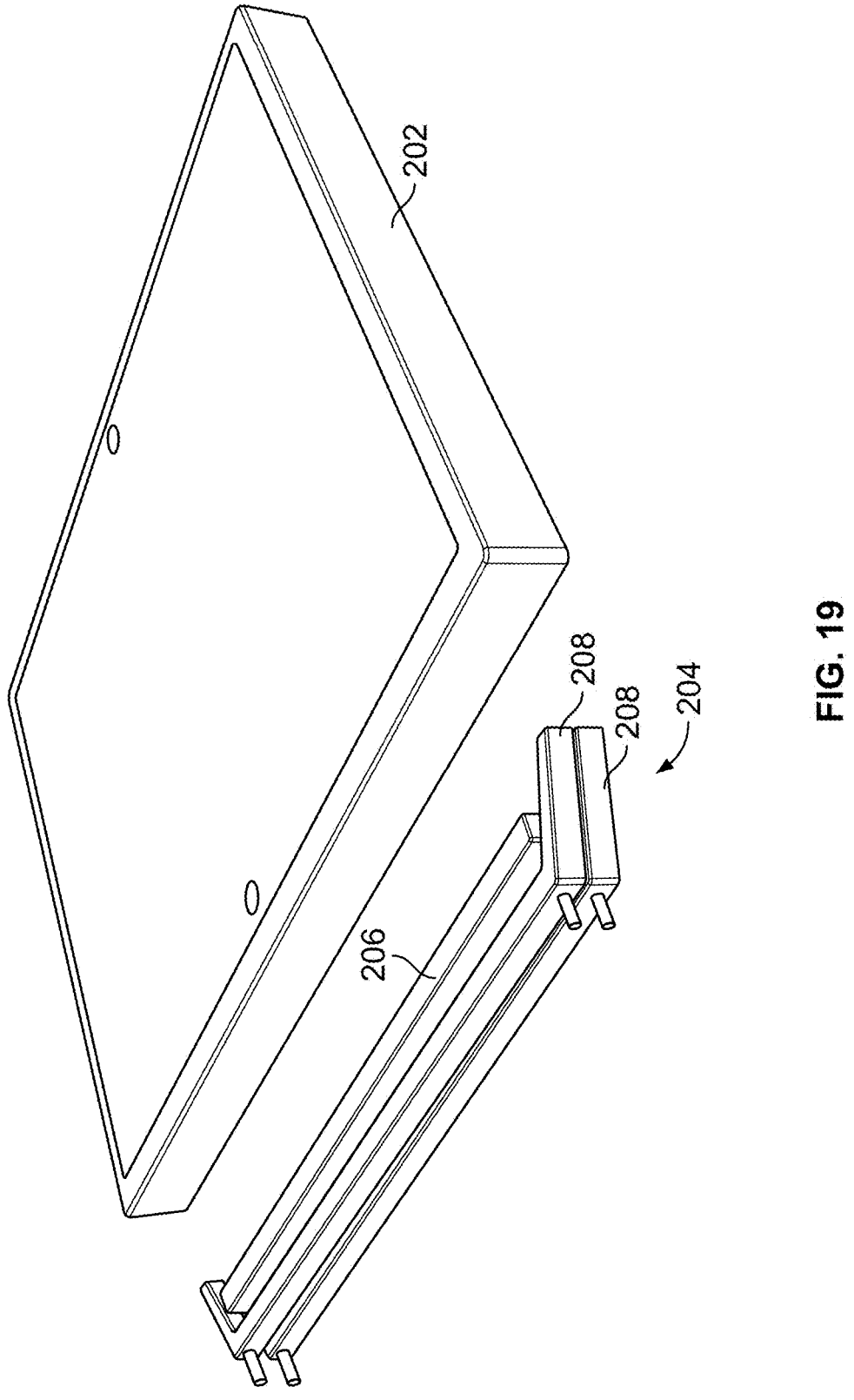
FIG. 19 is a perspective view of the bed of FIGS. 18A and 18B in a shipping configuration.

FIG. 19 is a perspective view of the bed 200, disassembled and in a shipping configuration. The frame 204 and/or the foundation 202 can be sized and configured to be placed in one or more shipping boxes.

Figure 20:
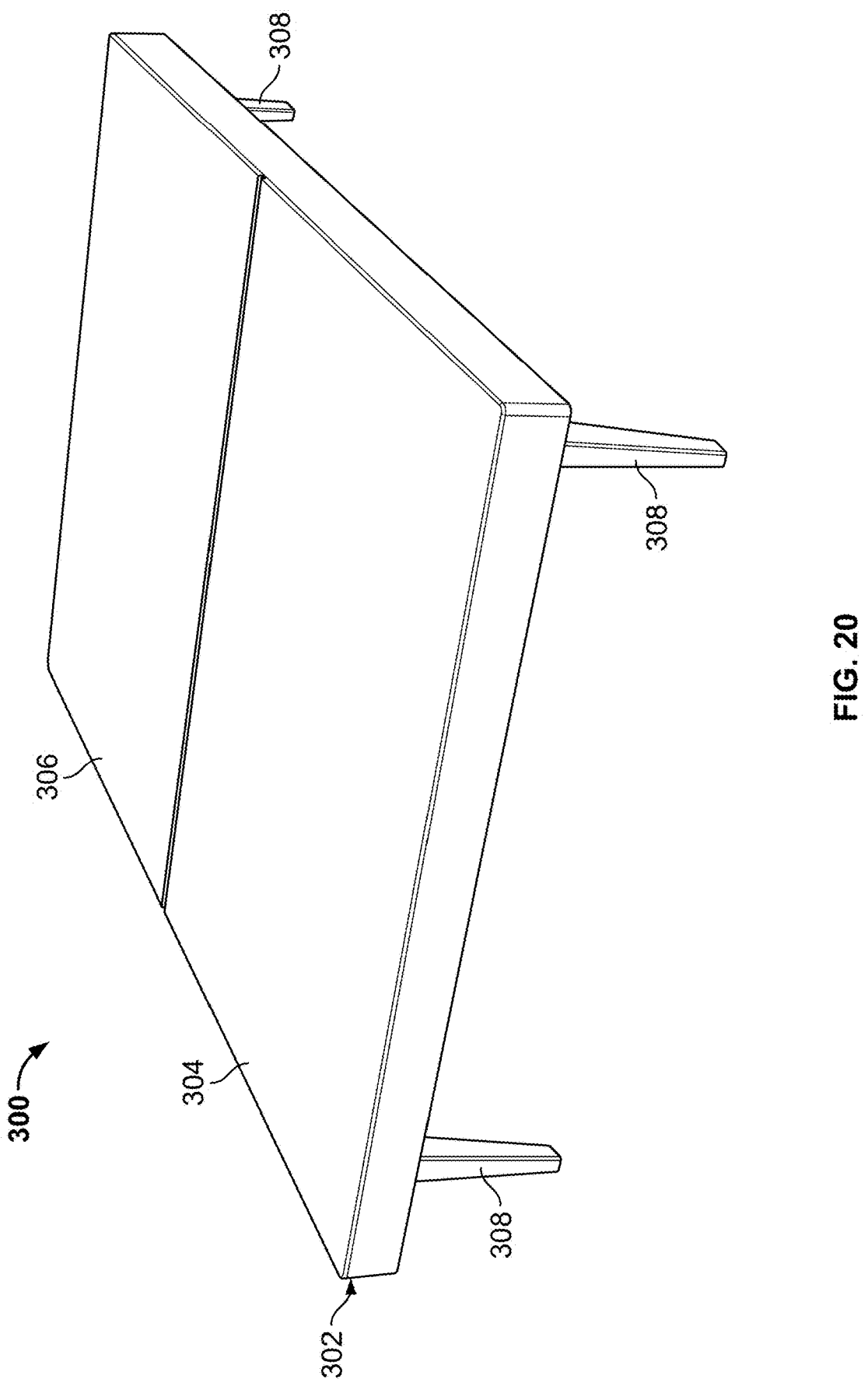
FIG. 20 is a perspective view of another embodiment of a bed in an open position.
Figure 21:
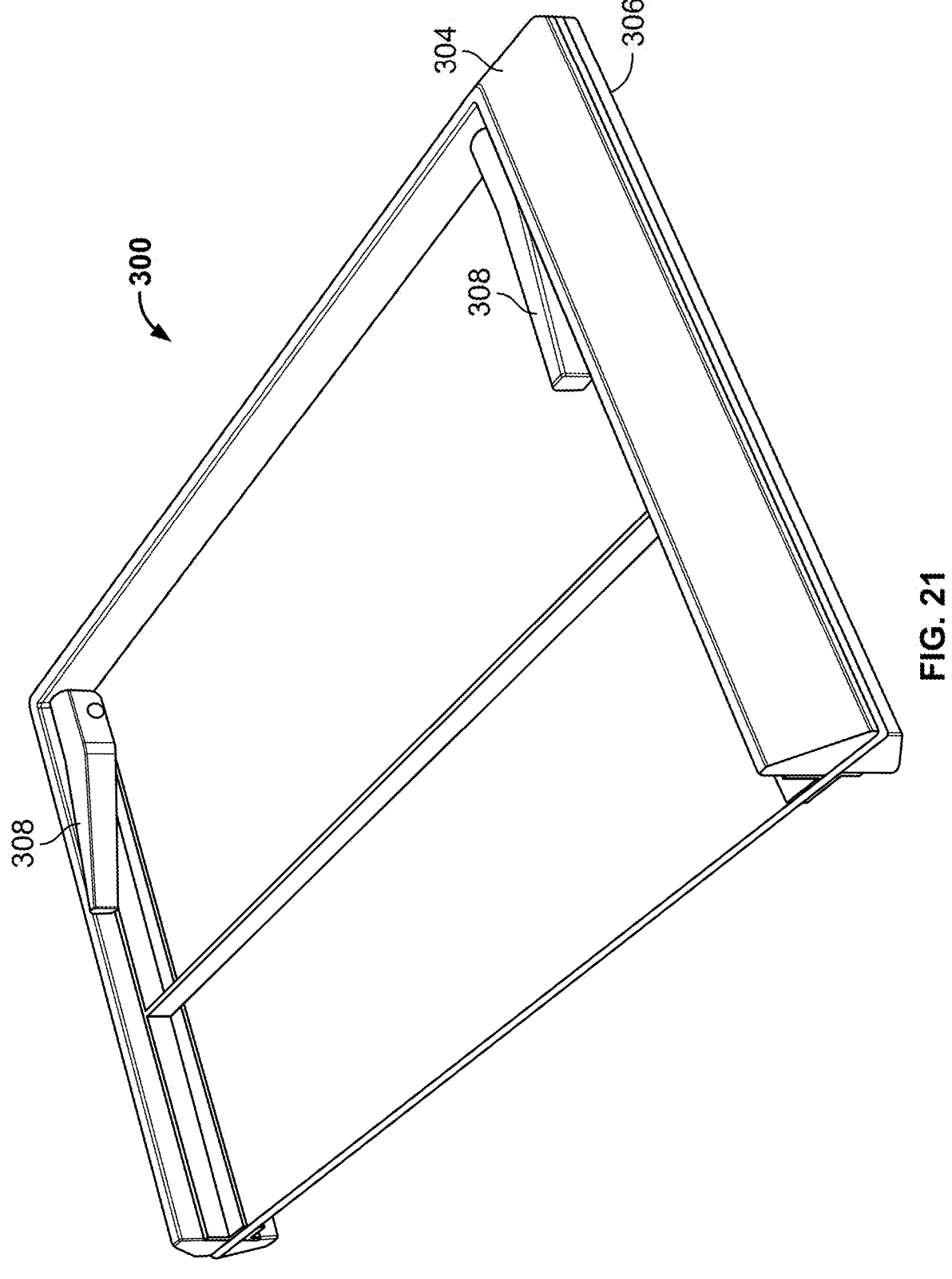
FIG. 21 is a perspective view of the bed of FIG. 20 in a folded, shipping configuration.

FIG. 20 is a perspective view of another embodiment of a bed 300 in an open deployed position ready to receive and support a mattress (not shown). FIG. 21 is a perspective view of the bed 300 in a folded, shipping configuration. The bed 300 can include a combination foundation frame 302 having first and second platforms 304 and 306 and foldable legs 308. The first platform 304 can be hingedly connected to the second platform 306 so as to be foldable. The foldable legs 308 can be pivotably connected to the first and second platforms 304 and 306 and can be folded between an extended position and a compact, shipping position.

In some embodiments, the bed 300 can be sized and configured to be placed in one or more shipping boxes. In some of such embodiments, the bed 300 can be folded so as to be placed in a single shipping box that is small enough to be shipped by a common carrier, such as United Parcel Service, Inc. ("UPS").

Figures 22A, 22B, 22C:
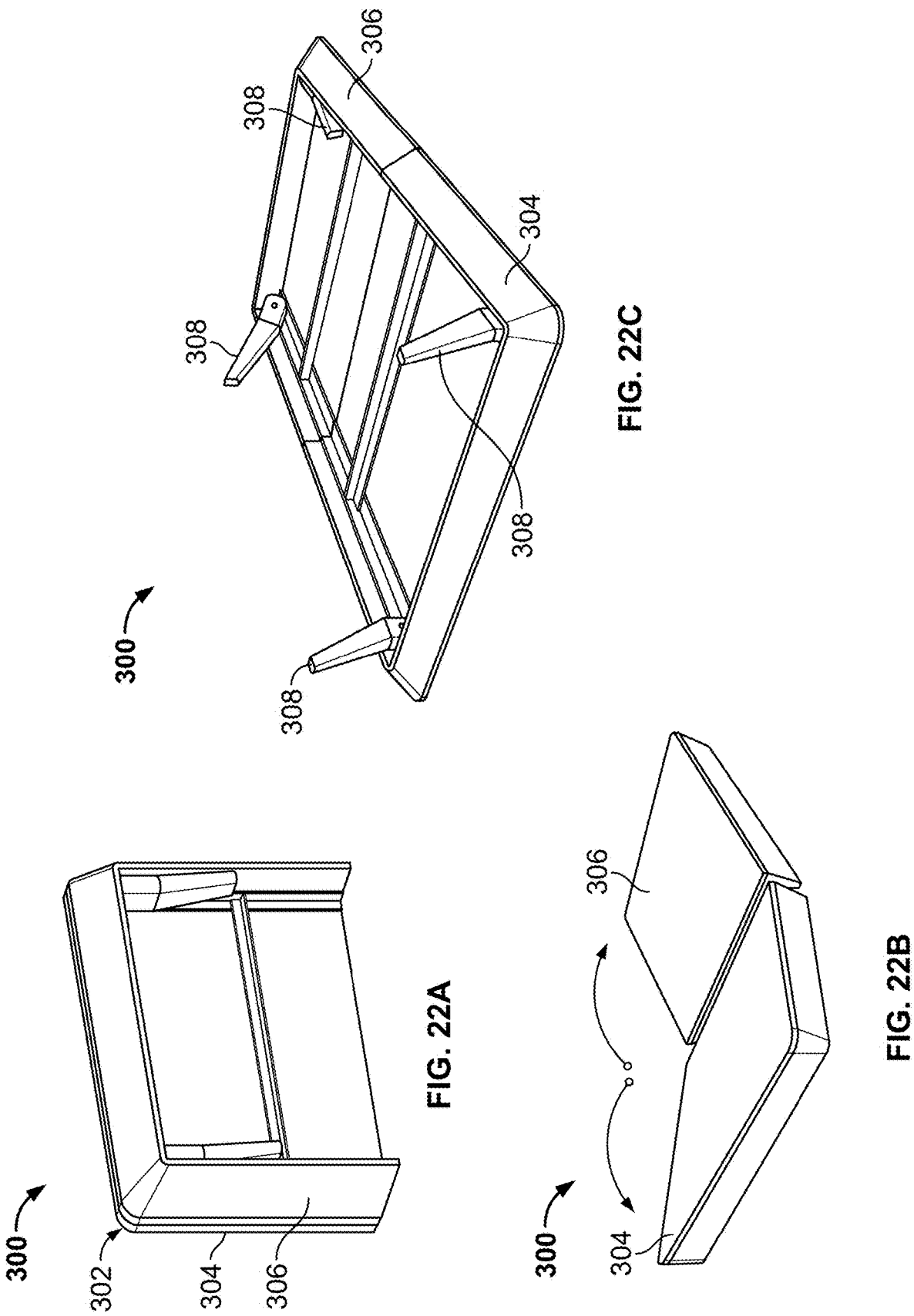
FIGS. 22A-22C are perspective views of the bed of FIG. 20.

FIGS. 22A-22C are perspective views of the bed 300. The bed 300 is shown in a folded position (FIG. 22A), a partially unfolded position (FIG. 22B), and a partially unfolded position with the foldable legs 308 partially deployed (FIG. 22C).

Figures 23A, 23B:
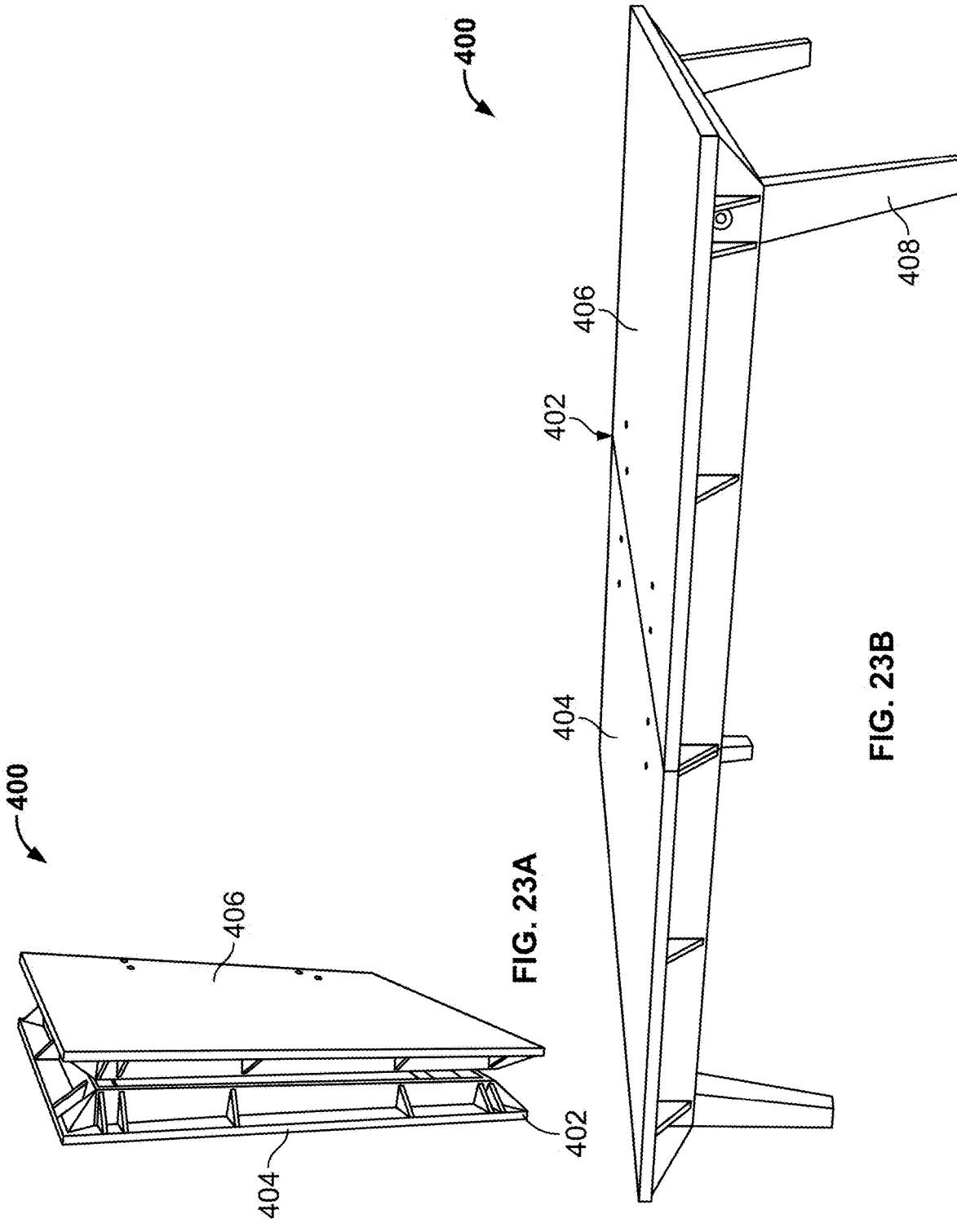
FIGS. 23A and 23B are perspective views of another embodiment of a bed.

FIGS. 23A and 23B are perspective views of another embodiment of a bed 400. The bed 400 can include a combination foundation frame 402 having first and second platforms 404 and 406 and foldable legs 408. The first platform 404 can be hingedly connected to the second platform 406 so as to be foldable. The foldable legs 408 can be pivotably connected to the first and second platforms 404 and 406 and can be folded between an extended position and a compact, shipping position.

In some embodiments, the bed 400 can be sized and configured to be placed in one or more shipping boxes that can be shipped by a common carrier. FIG. 23A shows the bed 400 in a folded, shipping configuration. FIG. 23B shows the bed 400 in a deployed configuration that is ready to receive and support a mattress (not shown).

Figure 24:
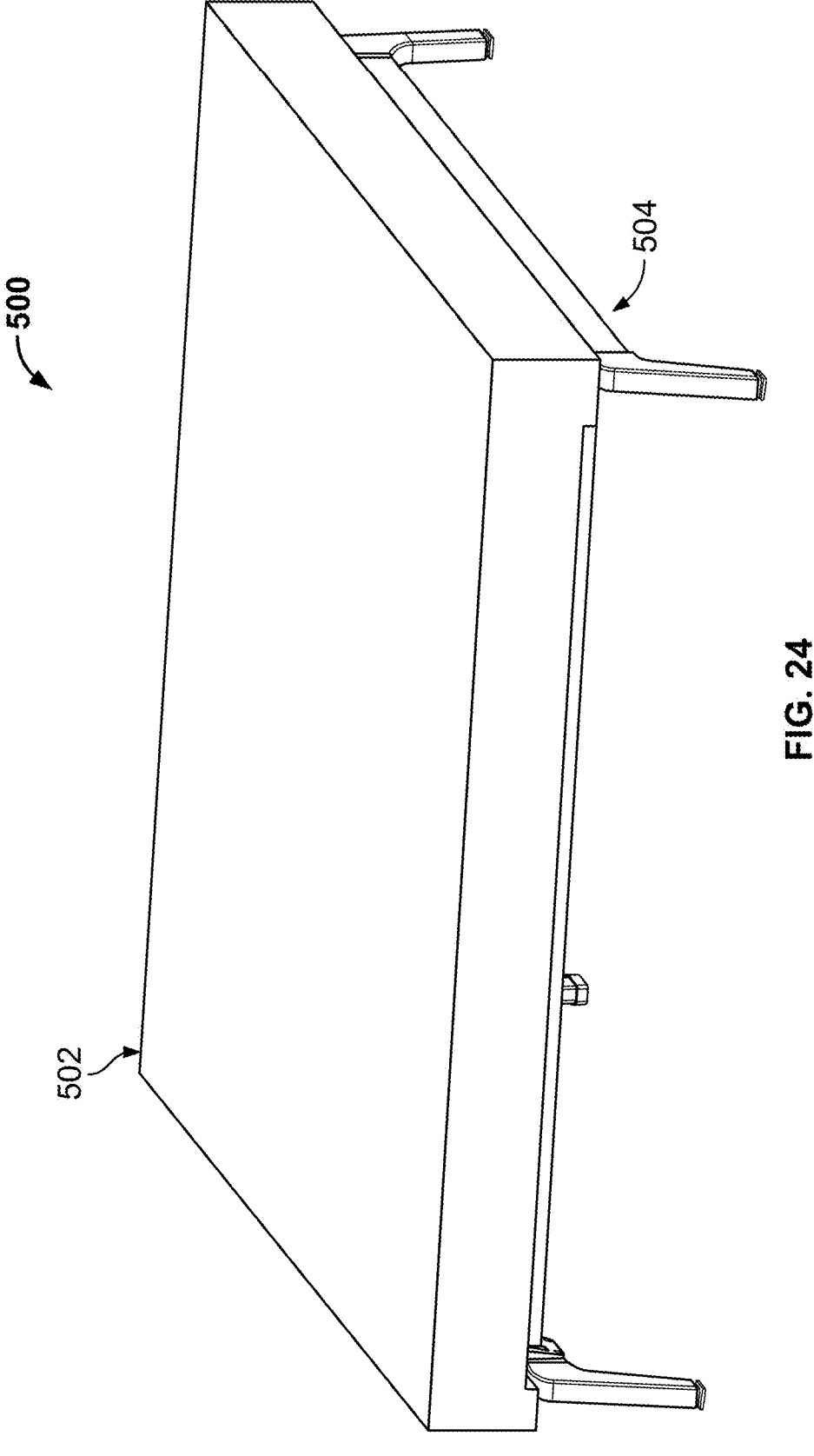
FIG. 24 is a perspective view of another embodiment of a bed having a foundation and a frame.

FIG. 24 is a perspective view of an embodiment of a bed 500 having a foundation 502 and a frame 504. The frame 504 can be positioned on a floor or other suitable surface and the foundation 502 can be positioned on and supported by the frame 504. A mattress (not shown) can be positioned on and supported by the foundation 502. In some embodiments, the bed 500 can have similar features and functions as described above with respect to bed 10. For example, the bed 500 can be assembled and connected in a manner similar to that of the bed 10, but with some differences as described in FIGS. 25-29.

Figure 25:
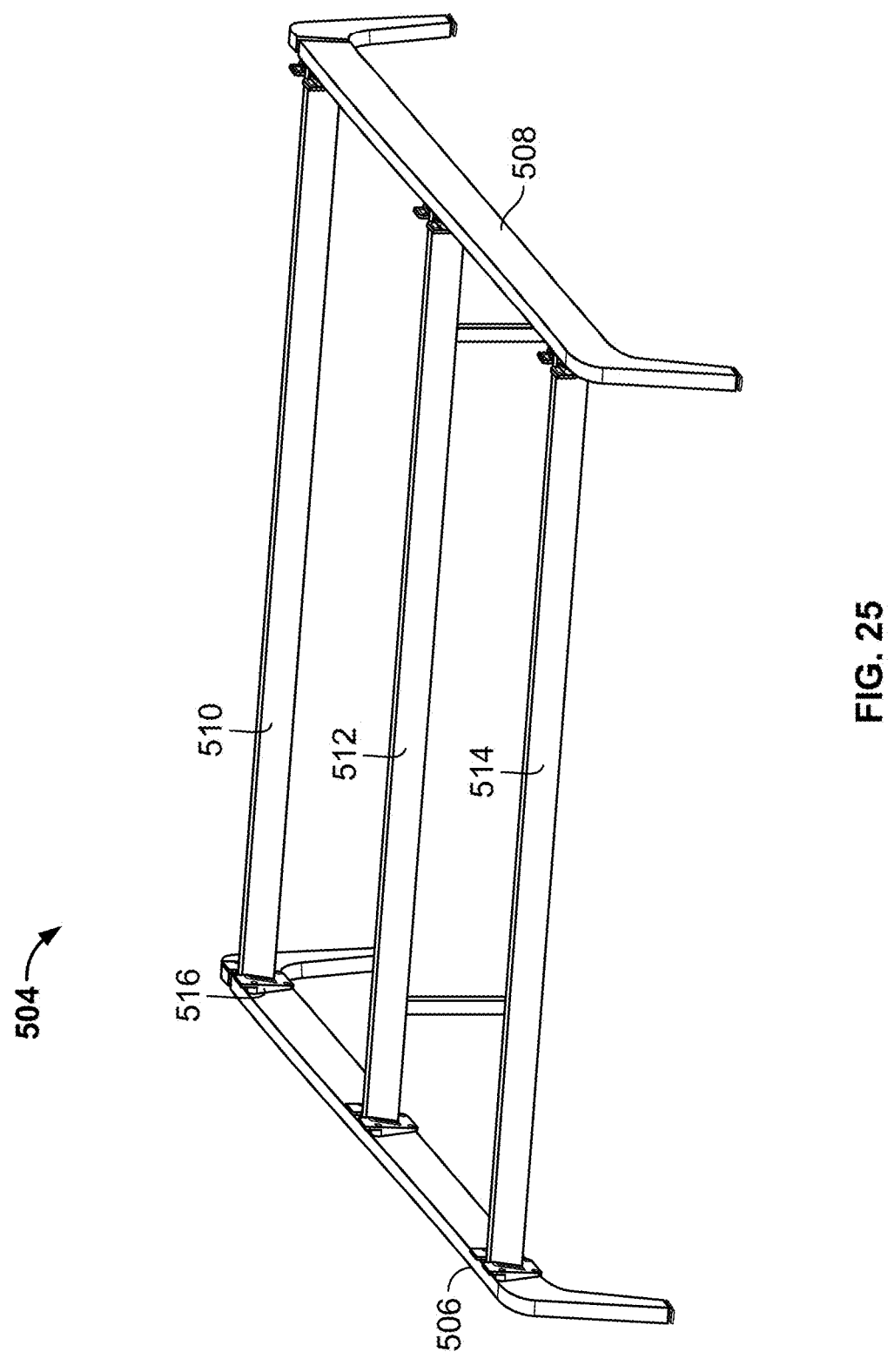
FIG. 25 is a perspective view of the frame of FIG. 24.

FIG. 25 is a perspective view of the frame 504, which can include leg portions 506 and 508 connected by cross members 510, 512, and 514. The cross members 510, 512, and 514 can connect at their respective ends to inner surfaces of longitudinal support sections of the leg portions 506 and 508 to form a relatively rigid support structure for supporting the foundation 500 (shown in FIGS. 24, 28, and 29).

In some embodiments, the cross-members 510, 512, and 514 can be connected to the leg portions 506 and 508 via fastening mechanisms 516. In the illustrated embodiment, each of the cross-members 510, 512, and 514 is attached via a fastening mechanism 516 at each of their respective ends.

In some embodiments, the frame 504 can be the same or similar to frame 14 described above, with the exception that the fastening mechanisms 516 can be used to replace the fastening mechanisms 86 and/or the connectors 88.

Figure 26:
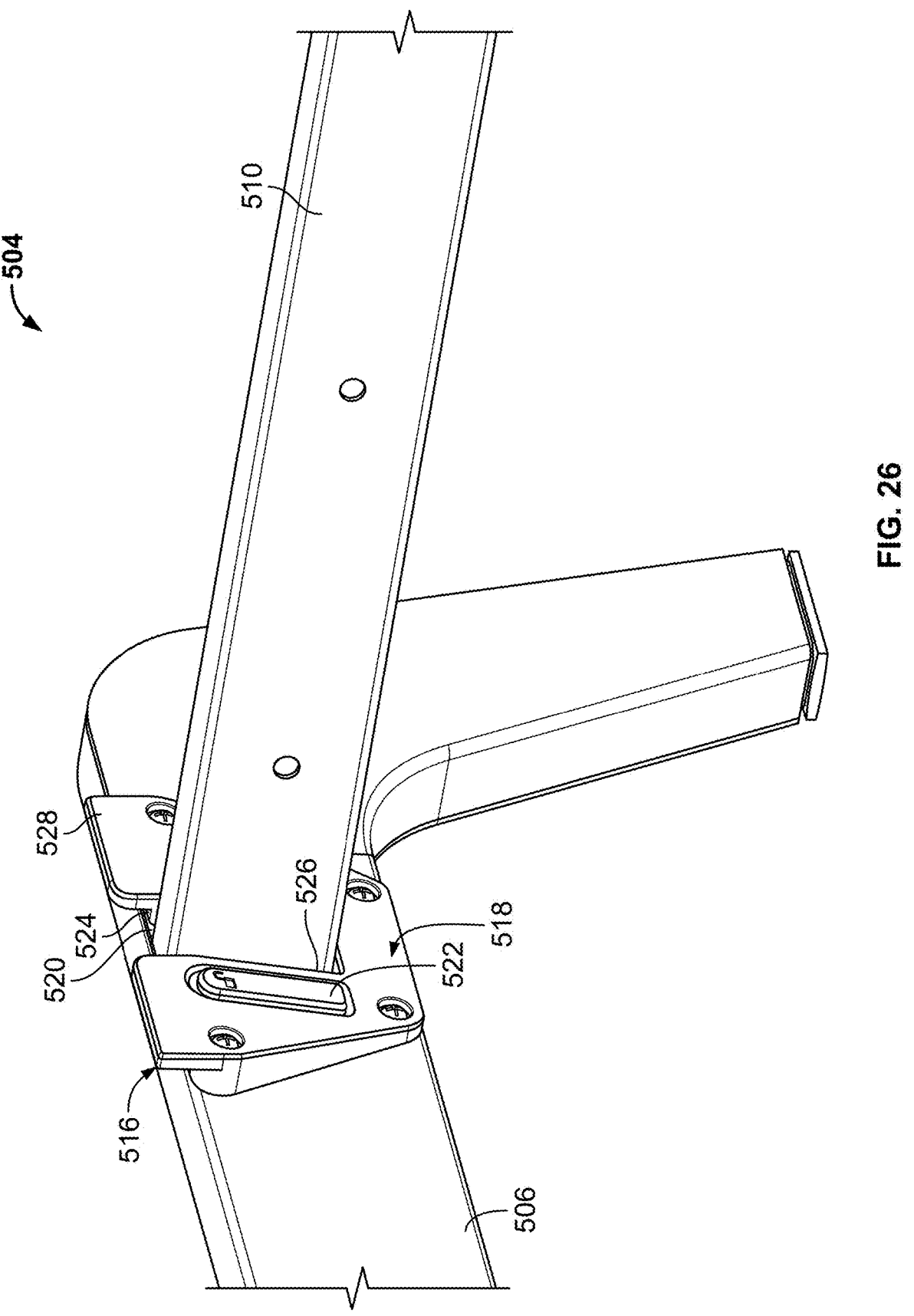
FIG. 26 is a perspective view of a cross-member connected to a leg portion.

FIG. 26 is a perspective view of the cross-member 510 connected to the leg portion 506 via the fastening mechanism 516. The fastening mechanism 516 can include a bracket 518, a flange 520, and a lock 522. The flange 520 can be a metal flange fixed at an end of the cross-member 510 (such as via welding, for example) for connecting to the bracket 518. The bracket 518 and lock 522 can be injection molded polymers. For example, in some embodiments the bracket 518 can be an impact-modified nylon material suitable for receiving and supporting the flange 520 made out of a metal, such as steel. The bracket 518 can be load bearing, and use of impact-modified nylon can allow the bracket 518 to be suitably ductile so as to prevent or resist cracking when supporting a steel flange 520. In other embodiments, other materials suitable for the application can be used.

The bracket 518 can be fastened to the leg portion 506 (via screws, bolts, adhesive, or other fasteners) so as to define a slot 524 between the bracket 518 and an inner surface of the leg portion 506 for receiving the flange 520 of the cross-member 510. The bracket 518 can be substantially U-shaped with another slot 526 in the middle for receiving and supporting the cross-member 510. Accordingly, the cross-member 510 can be attached from a top direction with the flange 520 being inserted into the slot 524 between the bracket 518 and the leg portion 506 and the cross member 510 being inserted in the slot 526 defined by the bracket 518. This arrangement can allow the fastening mechanism 516 to connect the cross-member 510 to the leg portion 506 relatively quickly and easily, while also providing strong and secure support for holding the cross-member 510 in position.

In some embodiments, the bracket 518 can include a ridge 528 for connecting the foundation 502 to the frame 504. The ridge 528 can extend from a top of the bracket 518 and be configured for connecting to a mating feature under the frame 504. Operation of the ridge 528 will be explained further below with respect to FIGS. 28 and 29.

In some embodiments, the fastening mechanism 516 can include the lock 522 for locking the cross-member 510 to the leg portion 506. For example, the lock 522 can be pivotably connected to the bracket 518 for selectively locking the flange 520 in the fastening mechanism 516.

Figure 27:
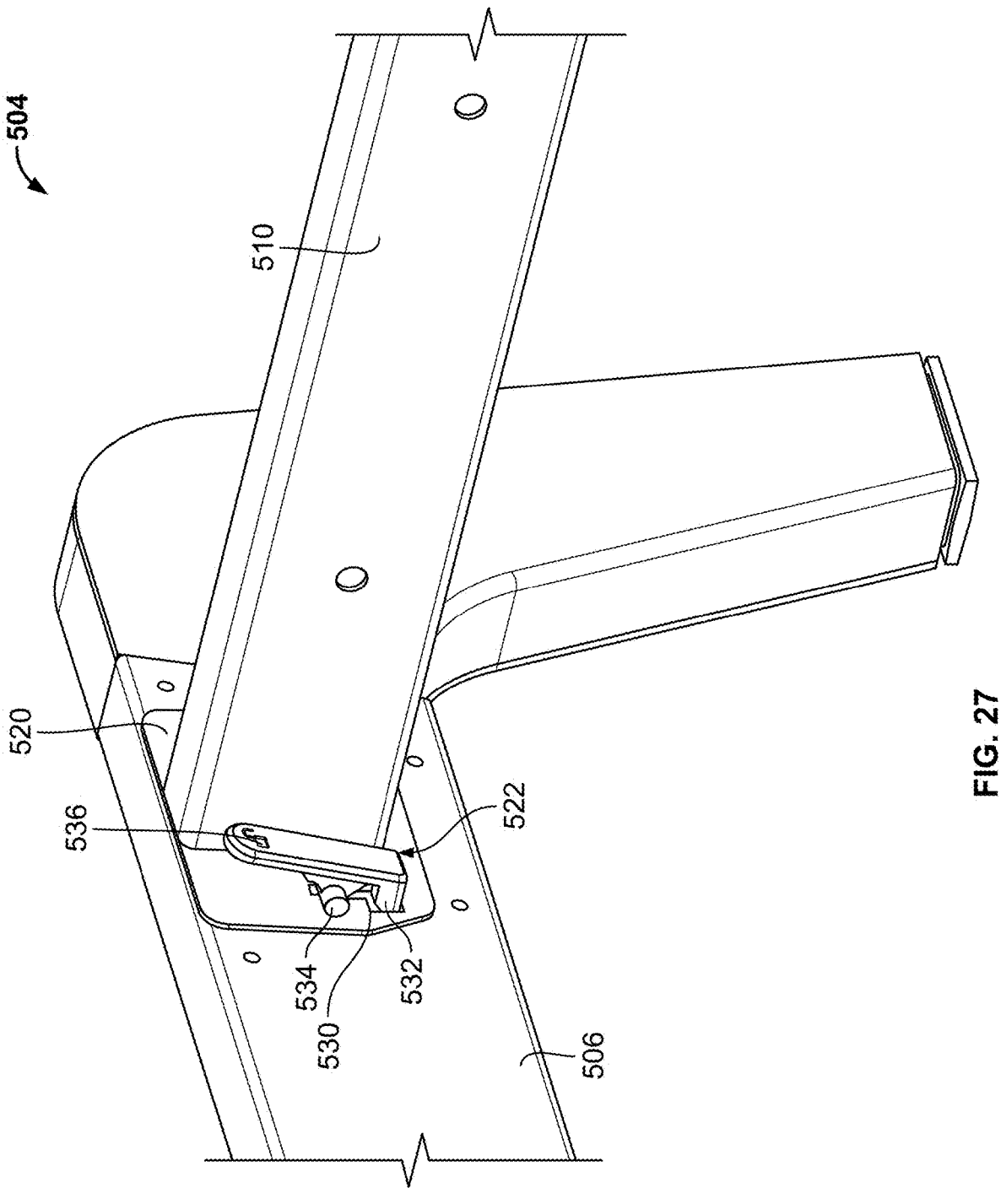
FIG. 27 is a perspective view of the cross-member and leg portion of FIG. 26, with a bracket removed.

FIG. 27 is a perspective view of the cross-member 510 and the leg portion 506, with the bracket 518 removed for clarity. As shown in FIG. 27, the flange 520 can define a slot 530 for receiving and locking to the lock 522. For example, the lock 522 can include a tab 532 sized and positioned to be received in the slot 530. The tab 532 can be shaped to allow the flange 520 to move downward when inserted in the fastening mechanism 516 and to resist movement upwards for releasably connecting the cross-member 510 to the leg portion 506. The lock 522 can click into place with the tab 532 snapping into the slot 530 when the flange 520 is in a proper position.

In some embodiments, the lock 522 can be a pivotable lock, including a pivot mechanism 534 (such as an axle) and a lever end 536. The pivot mechanism 534 can be operably connected to the flange 518 so as to allow the lock 522 to pivot with respect to the flange 518 when actuated by a user pressing on the lever end 536. A user can press on the lever end 536 to actuate the lock 522, which can then pivot about the pivot mechanism 534 to raise the tab 532 out of the slot 530. The fastening mechanism 516 can include one or more springs (not shown in FIG. 27) which can resiliently bias the lock 522 in a locked position, and can be compressed when the lock 522 is pivoted to a released position.

When actuated in an unlocked position, a user can raise the cross-member 510 out of the fastening mechanism 516. When actuated in a locked position, the lock 522 can retain the cross-member 510 in position. This arrangement can allow the fastening mechanism 516 to connect the cross-member 510 to the leg portion 506 relatively quickly and easily, and in some cases, without the need for tools and/or additional hardware (such as screws and bolts). In some embodiments, the shape and structure of the fastening mechanism 516 can be modified (including the omission of one or more features) while still allowing for a user to selectively fasten the cross-member 510 to the leg portion 506.

Figure 28:
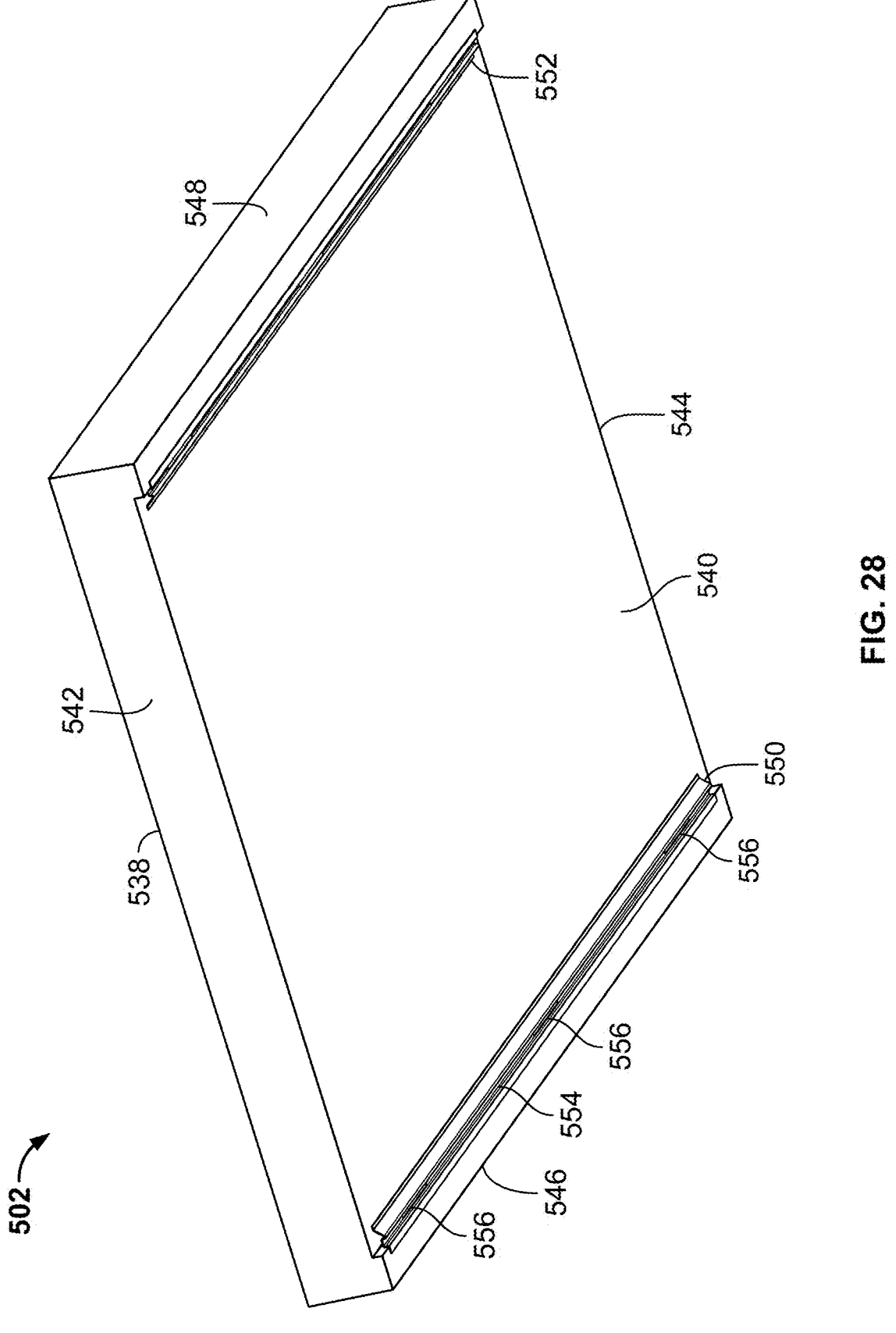
FIG. 28 is a perspective bottom view of the foundation of FIG. 24.

FIG. 28 is a perspective bottom view of the foundation 504, having a top 538, a bottom 540, a head 542, a foot 544, and sides 546 and 548. The foundation 504 has receivers 550 and 552 extending along the sides 546 and 548 of the foundation 504. The receivers 550 and 552 are connecters that are spaced from but still near the sides 546 and 548. The receivers 550 and 552 can be mounted to the bottom 540 of the foundation 504, and can extend along some or all of the distance from the foot 544 to the head 542 of the foundation 504.

In some embodiments, the receivers 550 and 552 can each include a valley 554 extending along the longitudinal length of the receivers 550 and 552 and one or more slots 556 extending through the receivers 550 and 552. The slots 556 can be positioned along the receivers 550 and 552 at the valley 554 so as to receive the ridge 528 (shown in FIG. 26) of the bracket 518 (shown in FIG. 26) as explained further with respect to FIG. 29.

Figures 29, 30:
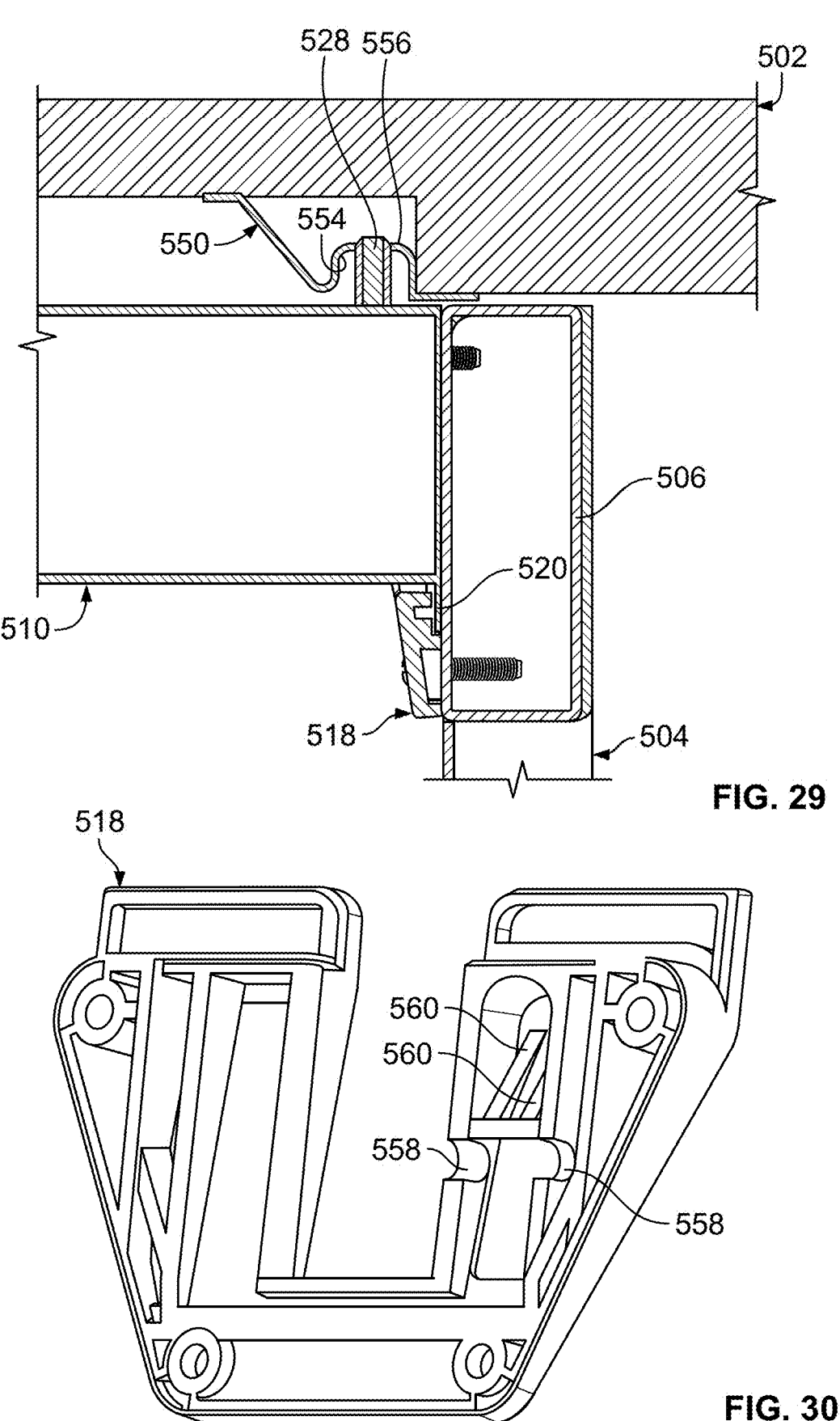
FIG. 29 is a sectional view of the foundation connected to the frame.
FIG. 30 is a rear perspective view of the bracket removed from FIG. 27.

FIG. 29 is a sectional view of the foundation 502 connected to the frame 504. As shown in FIG. 29, the ridge 528 of the bracket 518 is positioned so as to extend into both the valley 554 and the slot 556 of the receiver 550. During assembly, a user can first position the foundation 502 on top of the frame 504. The user can then push the foundation 502 laterally (i.e. side-to-side) until the ridge 528 falls into the valley 554. At that point, the valley 554 can restrict movement of the foundation 502 laterally, but can allow movement of the foundation 502 along a length of the receiver 550 (i.e. head-to-foot). The user can then push the foundation 502 lengthwise (i.e. from head-to-foot or foot-to-head) until the ridge 528 falls into the slot 556. In embodiments with multiple ridges 528 and multiple slots 556, each of the ridges 528 can fall into their respective slots 556. At that point, the foundation 502 can be retained with respect to the frame 504 to restrict movement laterally and lengthwise.

As illustrated in FIG. 29, the receiver 550 is a separate component connected to the bottom of the foundation 502. For example, the receiver 550 can be formed as an extruded polymer with flanges along its edges that are configured for being attached to the bottom of the foundation 502. In other embodiments, the receiver 550 can be integrally formed with the foundation 502.

As illustrated in FIG. 29, the frame 504 can be configured to receive and connect to the foundation 502 without the need for the above-described mechanism that includes the connectors 32A, 32B, and 88 (as shown in FIGS. 3A-6 and 9-13). The fastening mechanisms 516 can provide combined functionality of connecting the frame 504 to the foundation 502 as well as connecting the leg portions 506 and 508 to the cross-members 510, 512, and 514. In other embodiments, various components can be combined and modified as suitable for the application.

As illustrated in section in FIG. 29, the leg portion 506 and the cross-member 510 can be steel tube, each performing a load-bearing function for the frame 504. In other embodiments, the leg portion 506 can be MDF, such as described above for the leg portions 60 and 62.

FIG. 30 is a rear perspective view of the bracket 518. As shown in FIG. 30, the bracket 518 defines slots 558 for receiving the pivot mechanism 534 (shown in FIG. 27) and which act as a fulcrum about which the lock 522 (shown in FIGS. 26-27) pivots.

The fastening mechanism 516 can include one or more springs 560 for biasing the lock 522 in a locked position. In the illustrated embodiment, the springs 560 are cantilevered flat springs, integrally formed with the bracket 518 during an injection molding process. The springs 560 can extend outward and press against the lever end 536 (shown in FIG. 27) of the lock 522 to bias the lever end 536 outward and the tab 532 (shown in FIG. 27) inward. In other embodiments, another mechanism can be provided to bias the lock 522 in a locked position.

Accordingly, the bed 500 can be assembled relatively quickly and easily while still providing a strong, durable, and aesthetically pleasing structure for use as a bed. Some embodiments can be assembled and disassembled without tools, using intuitive connection mechanisms.

A number of embodiments of the invention have been described. Nevertheless, it will be understood that various modifications may be made without departing from the spirit and scope of the invention. For example, the leg portions 60, 62, 506, and 508 can have different shapes, orientations, and construction than that illustrated and described. Moreover, one, more than one, or all of the features of the various beds 10, 200, 300, 400, and 500 can be combined as suitable for a given application. Similarly, one or more features present on one or more of the various embodiments can be considered optional, and need not necessarily be included in all embodiments. Accordingly, other embodiments are within the scope of the following claims.

What is claimed is:

1. A bed sized and shaped for people, the bed comprising:
   a foundation configured to be converted between an extended position and a collapsed shipping position, the foundation comprising:
   a first platform having a first platform top and a first platform bottom;
   a second platform having a second platform top and a second platform bottom; and
   a frame having a first portion and a second portion extending from the first platform and the second platform, respectively, the first and second portions spaced inward from an outer perimeter of each of the first and second platforms, respectively,
   wherein the first platform top faces away from the second platform top when the foundation is placed into the collapsed shipping position.

2. The bed of claim 1, wherein the first platform bottom of the first platform and the second platform bottom of the second platform contact when the foundation is placed into the collapsed shipping position.

3. The bed of claim 1, wherein the second platform is hingedly connected to the first platform so as to be foldable with the first platform top and the second platform top exterior to the first platform bottom of the first platform and the second platform bottom of the second platform when in the collapsed shipping position.

4. The bed of claim 1, wherein each of the first platform and the second platform comprise foldable legs, each of the foldable legs pivotably connected to one of the first and second platforms, wherein the foldable legs are configured to pivot inward towards a center of the foundation such that the foldable legs are completely contained within the first and second platforms when in the collapsed shipping position.

5. The bed of claim 4, wherein the first and second platforms and the foldable legs are configured to be contained within a shippable box when in the collapsed shipping position.

6. The bed of claim 4, wherein the foldable legs are configured to pivot outwards into an obtuse angle in the extended position, wherein the obtuse angle is obtuse with respect to a position of the foldable legs in the collapsed shipping position.

7. The bed of claim 4, wherein a width of each of the foldable legs decreases as away from the foundation.

8. The bed of claim 4, wherein the foldable legs are pivotably coupled to the frame.

9. The bed of claim 4, wherein the first and second portions define first and second valleys, respectively, that extend across lengths of the first and second portions between left and right sides of the foundation, and wherein distal ends of the foldable legs fit into the first and second valleys when the foldable legs are pivoted into the collapsed shipping position.

10. The bed of claim 4, wherein the first and second portions are fixedly connected to the first platform bottom and the second platform bottom, respectively.

11. The bed of claim 4, wherein the foundation defines a valley that extends along a longitudinal length of the foundation that is configured to receive the foldable legs.

12. The bed of claim 4, wherein the foldable legs remain attached to the first and second platforms in the collapsed shipping position.

13. The bed of claim 1, wherein the first and second platforms are configured to unfold from the collapsed shipping position into the extended position, wherein a top surface of the first and second platforms is flat to support a mattress for people when in the extended position.

14. The bed of claim 1, wherein the foundation comprises longitudinal support structures extending between the first portion and the second portion to a bottom surface of the first and second platforms.

15. The bed of claim 14, wherein the longitudinal support structures extend along a longitudinal length of the foundation at right and left sides of the foundation.

16. A mattress foundation comprising:
a first platform comprising a first platform top and a first frame portion extending from the first platform, the first frame portion spaced inward from an outer perimeter of the first platform;
a second platform hingedly connected to the first platform so as to move the first and second platforms between an extended position and a collapsed shipping position, the second platform comprising a second platform top and a second frame portion extending from the second platform, the second frame portion spaced inward from an outer perimeter of the second platform; and
foldable legs that are each individually pivotably connected to the first frame portion or the second frame portion so as to be folded between the extended position and the collapsed shipping position,
wherein the first platform top faces away from the second platform top when the mattress foundation is placed into the collapsed shipping position.

17. The mattress foundation of claim 16, wherein the foldable legs are further configured to pivot outwards into an obtuse angle in the extended position, wherein the obtuse angle is obtuse with respect to a position of the foldable legs in the collapsed shipping position.

18. A method for shipping a bed foundation, the method comprising:
folding legs of the bed foundation to contact bottom surfaces of a first platform and a second platform while a portion of the legs are in continual contact with inner side surfaces of portions of a frame extending from the first platform and the second platform, the portions of the frame comprising the inner side surfaces spaced inward from an outer perimeter of each of the first and second platforms, respectively; and
folding the first platform relative to the second platform of the bed foundation along a midpoint axis extending laterally across the bed foundation such that top surfaces of the first platform and the second platform face away from each other.

19. The method of claim 18, further comprising folding the legs into a valley defined by the bottom surfaces of the first and second platforms and the inner side surfaces of the frame, the valley extending along a longitudinal length of the foundation that is configured to receive the legs.

20. The method of claim 18, further comprising folding the legs by pivoting the legs inward towards a center of the foundation such that the legs are completely contained within the first and second platforms when in a collapsed shipping position.

* * * * *